US010409434B2

(12) United States Patent
Chang et al.

(10) Patent No.: US 10,409,434 B2
(45) Date of Patent: *Sep. 10, 2019

(54) INTEGRATED TOUCH SCREENS

(71) Applicant: Apple Inc., Cupertino, CA (US)

(72) Inventors: Shih Chang Chang, Cupertino, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,662

(22) Filed: Jan. 7, 2019

(65) Prior Publication Data

US 2019/0138135 A1    May 9, 2019

Related U.S. Application Data

(60) Continuation of application No. 15/593,182, filed on May 11, 2017, now abandoned, which is a
(Continued)

(51) Int. Cl.
*G06F 3/041* (2006.01)
*G06F 3/044* (2006.01)
(Continued)

(52) U.S. Cl.
CPC ............ *G06F 3/044* (2013.01); *G02F 1/1368* (2013.01); *G02F 1/13306* (2013.01);
(Continued)

(58) Field of Classification Search
CPC ...................................................... G06F 3/041
See application file for complete search history.

(56) References Cited

U.S. PATENT DOCUMENTS 2,751,555 A * 6/1956 Kirkpatrick ............ G01R 25/00
323/233
3,333,160 A * 7/1967 Gorski .................... F16K 31/02
251/129.04
(Continued)

FOREIGN PATENT DOCUMENTS

AU   2005246219   12/2005
CA   1243096 A   10/1988
(Continued)

OTHER PUBLICATIONS

Final Office Action dated Apr. 8, 2019, for U.S. Appl. No. 15/275,254, filed Sep. 23, 2016, 13 pages.
(Continued)

*Primary Examiner* — Vijay Shankar
*Assistant Examiner* — Cory A Almeida
(74) *Attorney, Agent, or Firm* — Kubota & Basol LLP

(57) ABSTRACT

Integrated touch screens are provided including drive lines formed of grouped-together circuit elements of a thin film transistor layer and sense lines formed between a color filter layer and a material layer that modifies or generates light. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

20 Claims, 16 Drawing Sheets

Related U.S. Application Data continuation of application No. 14/838,234, filed on Aug. 27, 2015, now Pat. No. 9,727,193, which is a continuation of application No. 14/666,174, filed on Mar. 23, 2015, now Pat. No. 9,146,414, which is a continuation of application No. 14/456,831, filed on Aug. 11, 2014, now Pat. No. 9,025,090, which is a division of application No. 12/976,997, filed on Dec. 22, 2010, now Pat. No. 8,804,056.

(51) Int. Cl.
| | |
|---|---|
| *G06F 1/16* | (2006.01) |
| *G02F 1/1343* | (2006.01) |
| *G02F 1/1333* | (2006.01) |
| *G02F 1/1368* | (2006.01) |
| *G02F 1/133* | (2006.01) |
| *G02F 1/1335* | (2006.01) |

(52) U.S. Cl.
CPC .... *G02F 1/13338* (2013.01); *G02F 1/133305* (2013.01); *G02F 1/133512* (2013.01); *G02F 1/133514* (2013.01); *G02F 1/134336* (2013.01); *G06F 1/16* (2013.01); *G06F 3/0412* (2013.01); *G06F 2203/04104* (2013.01); *G06F 2203/04108* (2013.01)

(56) References Cited

U.S. PATENT DOCUMENTS

| | | | | |
|---|---|---|---|---|
| 3,541,541 A | * | 11/1970 | Engelbart | G06F 3/03543 178/18.01 |
| 3,644,835 A | * | 2/1972 | Thompson | H03L 7/085 327/156 |
| 3,662,105 A | * | 5/1972 | Hurst | G06F 3/045 178/18.05 |
| 3,798,370 A | * | 3/1974 | Hurst | G01B 7/004 178/18.05 |
| 3,875,472 A | | 4/1975 | Schermerhorn | |
| 3,974,332 A | * | 8/1976 | Abe | G06F 3/044 178/18.08 |
| 4,194,083 A | * | 3/1980 | Abe | G06F 3/044 178/18.06 |
| 4,233,522 A | * | 11/1980 | Grummer | H03K 17/9622 307/116 |
| 4,246,452 A | * | 1/1981 | Chandler | G06F 3/0213 200/5 A |
| 4,250,495 A | * | 2/1981 | Beckerman | D05B 19/105 200/5 A |
| 4,266,144 A | * | 5/1981 | Bristol | G01F 23/263 307/116 |
| 4,268,815 A | * | 5/1981 | Eventoff | H01H 1/029 338/114 |
| 4,277,517 A | * | 7/1981 | Smith, Jr. | C23C 8/04 148/277 |
| 4,290,052 A | * | 9/1981 | Eichelberger | G06F 3/044 341/33 |
| 4,307,383 A | * | 12/1981 | Brienza | D05B 19/105 112/445 |
| 4,313,108 A | * | 1/1982 | Yoshida | G06F 3/0238 341/23 |
| 4,342,460 A | | 8/1982 | Eng | |
| 4,345,000 A | * | 8/1982 | Kawazoe | C08J 7/06 427/109 |
| 4,363,027 A | * | 12/1982 | Brienza | D05B 19/105 112/444 |
| 4,370,697 A | | 1/1983 | Haberl et al. | |
| 4,394,643 A | * | 7/1983 | Williams | H03K 17/962 341/33 |
| 4,516,112 A | | 5/1985 | Chen | |
| 4,526,043 A | * | 7/1985 | Boie | G01B 7/004 361/283.3 |
| 4,550,221 A | * | 10/1985 | Mabusth | G06F 3/03547 178/18.06 |
| 4,587,378 A | * | 5/1986 | Moore | G06F 3/045 345/173 |
| 4,618,989 A | * | 10/1986 | Tsukune | G06K 9/4633 382/170 |
| 4,623,757 A | * | 11/1986 | Marino | G06F 3/045 178/18.03 |
| 4,639,720 A | * | 1/1987 | Rympalski | G06F 3/033 341/33 |
| 4,672,364 A | * | 6/1987 | Lucas | G06F 3/0421 250/221 |
| 4,672,558 A | * | 6/1987 | Beckes | G06F 3/0421 341/31 |
| 4,675,569 A | | 6/1987 | Bowman et al. | |
| 4,686,332 A | * | 8/1987 | Greanias | G06F 3/044 345/173 |
| 4,692,809 A | * | 9/1987 | Beining | G06F 3/042 348/712 |
| 4,695,827 A | * | 9/1987 | Beining | G06F 3/042 341/31 |
| 4,707,845 A | * | 11/1987 | Krein | G06F 3/0418 178/18.05 |
| 4,723,056 A | * | 2/1988 | Tamaru | G06F 3/045 178/18.02 |
| 4,733,222 A | * | 3/1988 | Evans | G06F 3/044 200/600 |
| 4,734,685 A | * | 3/1988 | Watanabe | G06F 3/0317 345/157 |
| 4,740,781 A | * | 4/1988 | Brown | G06F 3/0412 341/33 |
| 4,746,770 A | * | 5/1988 | McAvinney | G06F 3/0421 178/18.09 |
| 4,771,276 A | * | 9/1988 | Parks | G06F 3/046 345/173 |
| 4,772,885 A | * | 9/1988 | Uehara | G02F 1/133603 345/102 |
| 4,788,384 A | * | 11/1988 | Bruere-Dawson | G06F 3/045 178/18.05 |
| 4,806,709 A | * | 2/1989 | Evans | G06F 3/044 178/18.06 |
| 4,806,846 A | * | 2/1989 | Kerber | G01R 27/2605 324/678 |
| 4,839,634 A | | 6/1989 | More et al. | |
| 4,853,493 A | * | 8/1989 | Schlosser | C02F 1/72 178/18.05 |
| 4,898,555 A | * | 2/1990 | Sampson | G06F 1/1601 178/18.01 |
| 4,908,710 A | | 3/1990 | Wakai et al. | |
| 4,910,504 A | * | 3/1990 | Eriksson | H01H 13/702 341/23 |
| 4,914,624 A | * | 4/1990 | Dunthorn | G06F 3/04886 345/173 |
| 4,916,308 A | * | 4/1990 | Meadows | G06F 3/0412 250/221 |
| 4,954,823 A | * | 9/1990 | Binstead | H03K 17/9622 341/26 |
| 4,964,302 A | | 10/1990 | Grahn et al. | |
| 4,968,877 A | * | 11/1990 | McAvinney | G10H 1/0553 250/221 |
| 5,003,519 A | * | 3/1991 | Noirjean | G04C 21/20 368/250 |
| 5,010,772 A | | 4/1991 | Bourland et al. | |
| 5,017,030 A | * | 5/1991 | Crews | B41J 5/10 400/476 |
| 5,062,198 A | * | 11/1991 | Sun | G06F 3/045 156/291 |
| 5,073,950 A | * | 12/1991 | Colbert | G06K 9/00067 382/115 |
| 5,105,186 A | * | 4/1992 | May | G06F 3/0421 341/31 |
| 5,105,288 A | * | 4/1992 | Senda | G09G 3/3648 345/87 |
| 5,113,041 A | * | 5/1992 | Blonder | G06F 3/044 345/173 |

(56) References Cited

U.S. PATENT DOCUMENTS

| | | | |
|---|---|---|---|
| 5,117,071 A * | 5/1992 | Greanias | G06F 3/03545 345/174 |
| 5,142,912 A | 9/1992 | Frische | |
| 5,159,323 A | 10/1992 | Akira et al. | |
| 5,178,477 A * | 1/1993 | Gambaro | B41J 5/10 400/489 |
| 5,189,403 A * | 2/1993 | Franz | G05G 9/047 345/168 |
| 5,194,862 A * | 3/1993 | Edwards | G06F 3/0412 341/20 |
| 5,209,126 A | 5/1993 | Grahn | |
| 5,224,861 A * | 7/1993 | Glass | A47C 7/72 244/118.5 |
| 5,239,152 A * | 8/1993 | Caldwell | H01H 13/702 200/5 R |
| 5,241,308 A * | 8/1993 | Young | G06F 3/0414 341/22 |
| 5,252,951 A * | 10/1993 | Tannenbaum | G06F 3/023 345/156 |
| 5,281,966 A * | 1/1994 | Walsh | G06F 3/0235 341/22 |
| 5,293,430 A * | 3/1994 | Shiau | H04N 1/40062 358/464 |
| 5,305,017 A * | 4/1994 | Gerpheide | G06F 3/0213 345/168 |
| 5,343,064 A | 8/1994 | Spangler et al. | |
| 5,345,543 A * | 9/1994 | Capps | G06F 3/04845 345/654 |
| 5,345,807 A | 9/1994 | Butts et al. | |
| 5,353,135 A * | 10/1994 | Edwards | G02F 1/133512 345/43 |
| 5,374,787 A * | 12/1994 | Miller | G06F 1/1626 178/18.06 |
| 5,376,948 A * | 12/1994 | Roberts | G06F 3/041 345/156 |
| 5,381,160 A * | 1/1995 | Landmeier | G06F 3/046 178/18.08 |
| 5,386,219 A * | 1/1995 | Greanias | G06F 3/044 345/174 |
| 5,392,058 A * | 2/1995 | Tagawa | B25J 19/0012 345/103 |
| 5,398,310 A * | 3/1995 | Tchao | G06F 3/0485 715/234 |
| 5,432,671 A * | 7/1995 | Allavena | G06F 3/044 345/173 |
| 5,442,742 A * | 8/1995 | Greyson | G06F 17/24 345/157 |
| 5,447,074 A | 9/1995 | Polaert et al. | |
| 5,457,289 A * | 10/1995 | Huang | G06F 3/044 178/18.06 |
| 5,459,463 A * | 10/1995 | Gruaz | G06F 3/044 178/18.03 |
| 5,463,388 A * | 10/1995 | Boie | G06F 3/044 341/33 |
| 5,463,696 A * | 10/1995 | Beemink | G06K 9/00429 382/186 |
| 5,483,261 A * | 1/1996 | Yasutake | G06F 3/0425 178/18.03 |
| 5,488,204 A * | 1/1996 | Mead | G06F 3/041 178/18.06 |
| 5,495,077 A | 2/1996 | Miller et al. | |
| 5,499,026 A * | 3/1996 | Liao | H03K 17/9645 341/26 |
| 5,510,813 A | 4/1996 | Makinwa et al. | |
| 5,513,309 A * | 4/1996 | Meier | G06F 3/04845 345/179 |
| 5,523,775 A * | 6/1996 | Capps | G06F 3/04842 178/18.01 |
| 5,530,455 A * | 6/1996 | Gillick | G06F 3/0312 345/156 |
| 5,534,892 A * | 7/1996 | Tagawa | G06F 3/0412 178/20.01 |
| 5,543,588 A * | 8/1996 | Bisset | G06F 1/1626 178/18.06 |
| 5,543,589 A * | 8/1996 | Buchana | G06F 3/0414 178/18.03 |
| 5,543,590 A * | 8/1996 | Gillespie | G06F 3/041 178/18.06 |
| 5,543,591 A * | 8/1996 | Gillespie | G06F 3/038 178/18.03 |
| 5,550,659 A * | 8/1996 | Fujieda | G06F 3/0412 345/104 |
| 5,552,787 A * | 9/1996 | Schuler | G01S 7/024 342/25 A |
| 5,553,500 A | 9/1996 | Grahn et al. | |
| 5,563,632 A * | 10/1996 | Roberts | G06F 3/041 345/156 |
| 5,563,727 A * | 10/1996 | Larson | G02F 1/1362 345/90 |
| 5,563,996 A * | 10/1996 | Tchao | G06F 3/0485 715/201 |
| 5,565,658 A * | 10/1996 | Gerpheide | G06F 3/041 178/18.02 |
| 5,572,205 A * | 11/1996 | Caldwell | H03K 17/9622 200/600 |
| 5,574,262 A | 11/1996 | Petty | |
| 5,576,070 A * | 11/1996 | Yaniv | G02F 1/133512 156/108 |
| 5,579,036 A * | 11/1996 | Yates, IV | G06F 3/044 178/18.06 |
| 5,581,681 A | 12/1996 | Tchao et al. | |
| 5,583,946 A * | 12/1996 | Gourdol | G06F 3/04883 345/179 |
| 5,589,856 A * | 12/1996 | Stein | G06F 3/04886 345/173 |
| 5,590,219 A | 12/1996 | Gourdol | |
| 5,592,566 A * | 1/1997 | Pagallo | G06K 9/00429 382/187 |
| 5,594,806 A * | 1/1997 | Colbert | G06K 9/00006 382/115 |
| 5,594,810 A | 1/1997 | Gourdol | |
| 5,596,694 A * | 1/1997 | Capps | G06F 3/0481 345/473 |
| 5,612,719 A * | 3/1997 | Beemink | G06F 3/04883 345/172 |
| 5,623,280 A * | 4/1997 | Akins | G02F 1/13338 345/104 |
| 5,631,805 A * | 5/1997 | Bonsall | G06F 1/181 361/679.27 |
| 5,633,955 A * | 5/1997 | Bozinovic | G06K 9/00416 382/187 |
| 5,634,102 A * | 5/1997 | Capps | G06F 9/451 715/744 |
| 5,636,101 A * | 6/1997 | Bonsall | G06F 1/181 361/679.27 |
| 5,638,093 A * | 6/1997 | Takahashi | G06F 3/0436 178/19.02 |
| 5,642,108 A * | 6/1997 | Gopher | G06F 3/0235 341/22 |
| 5,644,657 A * | 7/1997 | Capps | G06F 15/0283 382/229 |
| 5,648,642 A | 7/1997 | Miller et al. | |
| 5,650,597 A * | 7/1997 | Redmayne | G06F 3/044 178/18.06 |
| 5,666,113 A * | 9/1997 | Logan | G06F 3/0488 341/22 |
| 5,666,502 A * | 9/1997 | Capps | G06F 3/0489 715/236 |
| 5,666,552 A | 9/1997 | Greyson et al. | |
| 5,673,041 A | 9/1997 | Chatigny et al. | |
| 5,675,361 A * | 10/1997 | Santilli | G06F 3/0213 345/156 |
| 5,677,710 A * | 10/1997 | Thompson-Rohrlich | G06F 3/04883 345/173 |
| 5,677,744 A * | 10/1997 | Yoneda | G02F 1/13338 345/104 |
| 5,680,160 A | 10/1997 | LaPointe | |

(56) References Cited

U.S. PATENT DOCUMENTS

| | | | | |
|---|---|---|---|---|
| 5,686,973 A * | 11/1997 | Lee | H04N 19/543 | 348/699 |
| 5,689,253 A * | 11/1997 | Hargreaves | B41J 5/10 | 341/22 |
| 5,710,844 A | 1/1998 | Capps et al. | | |
| 5,729,250 A * | 3/1998 | Bishop | G06F 1/1607 | 345/173 |
| 5,730,165 A * | 3/1998 | Philipp | E03C 1/057 | 137/1 |
| 5,734,742 A * | 3/1998 | Asaeda | G01N 21/88 | 382/107 |
| 5,734,751 A * | 3/1998 | Saito | G06K 9/4604 | 382/203 |
| 5,736,976 A * | 4/1998 | Cheung | G06F 3/0219 | 341/22 |
| 5,741,990 A * | 4/1998 | Davies | G09B 15/004 | 84/423 R |
| 5,745,116 A * | 4/1998 | Pisutha-Arnond | G06F 3/04883 | 715/821 |
| 5,745,716 A * | 4/1998 | Tchao | G06F 3/0483 | 715/777 |
| 5,748,269 A * | 5/1998 | Harris | G02F 1/133308 | 349/12 |
| 5,760,857 A | 6/1998 | Yanagawa et al. | | |
| 5,764,218 A * | 6/1998 | Della Bona | G06F 3/04883 | 345/157 |
| 5,764,818 A * | 6/1998 | Capps | G06F 15/0283 | 382/317 |
| 5,767,457 A * | 6/1998 | Gerpheide | G06F 3/0488 | 178/18.03 |
| 5,767,842 A * | 6/1998 | Korth | G06F 3/011 | 345/168 |
| 5,777,596 A * | 7/1998 | Herbert | G06F 3/0412 | 345/104 |
| 5,790,104 A * | 8/1998 | Shieh | G06F 3/04886 | 345/156 |
| 5,790,106 A * | 8/1998 | Hirano | G06F 3/041 | 178/18.06 |
| 5,790,107 A * | 8/1998 | Kasser | G06F 3/044 | 178/18.06 |
| 5,801,340 A | 9/1998 | Peter | | |
| 5,802,516 A * | 9/1998 | Shwarts | G06F 3/0483 | |
| 5,805,144 A * | 9/1998 | Scholder | G06F 3/03547 | 345/163 |
| 5,808,567 A * | 9/1998 | McCloud | H03K 17/9622 | 200/5 A |
| 5,809,166 A * | 9/1998 | Huang | G06K 9/342 | 382/174 |
| 5,809,267 A * | 9/1998 | Moran | G06F 3/04883 | 715/863 |
| 5,815,141 A * | 9/1998 | Phares | G06F 3/045 | 178/18.05 |
| 5,821,690 A * | 10/1998 | Martens | C09K 11/06 | 313/506 |
| 5,821,930 A * | 10/1998 | Hansen | G06F 3/0481 | 715/702 |
| 5,823,782 A * | 10/1998 | Marcus | G09B 1/06 | 434/156 |
| 5,825,351 A * | 10/1998 | Tam | G06F 3/044 | 345/173 |
| 5,825,352 A * | 10/1998 | Bisset | G06F 3/044 | 345/173 |
| 5,831,170 A | 11/1998 | Sokn | | |
| 5,835,079 A * | 11/1998 | Shieh | G06F 3/0488 | 345/173 |
| 5,838,308 A * | 11/1998 | Knapp | G06F 3/0412 | 345/173 |
| 5,841,078 A | 11/1998 | Miller et al. | | |
| 5,841,415 A * | 11/1998 | Kwon | G09G 3/3655 | 345/90 |
| 5,844,506 A * | 12/1998 | Binstead | G06F 3/0202 | 341/34 |
| 5,847,690 A * | 12/1998 | Boie | G06F 3/0412 | 345/104 |
| 5,852,487 A * | 12/1998 | Fujimori | G02F 1/13338 | 349/162 |
| 5,854,450 A * | 12/1998 | Kent | G06F 3/0418 | 178/18.04 |
| 5,854,625 A * | 12/1998 | Frisch | G06F 3/0414 | 345/173 |
| 5,856,822 A * | 1/1999 | Du | G06F 3/03547 | 345/157 |
| 5,861,583 A * | 1/1999 | Schediwy | G06F 3/041 | 178/18.01 |
| 5,861,875 A * | 1/1999 | Gerpheide | G06F 3/041 | 178/18.06 |
| 5,867,151 A * | 2/1999 | Nakai | G06F 3/041 | 345/173 |
| 5,869,790 A * | 2/1999 | Shigetaka | G06F 3/0414 | 178/18.01 |
| 5,869,791 A * | 2/1999 | Young | G06F 3/0414 | 178/18.01 |
| 5,880,411 A * | 3/1999 | Gillespie | G06F 3/03547 | 178/18.01 |
| 5,889,236 A | 3/1999 | Gillespie et al. | | |
| 5,898,434 A * | 4/1999 | Small | G06F 3/0481 | 715/810 |
| 5,914,465 A * | 6/1999 | Allen | G06F 1/1626 | 178/18.06 |
| 5,915,285 A | 6/1999 | Sommer | | |
| 5,917,165 A * | 6/1999 | Platt | H03K 17/962 | 200/511 |
| 5,920,298 A * | 7/1999 | McKnight | G09G 3/2011 | 345/100 |
| 5,920,309 A * | 7/1999 | Bisset | G06F 3/044 | 178/18.06 |
| 5,923,319 A | 7/1999 | Bishop et al. | | |
| 5,926,161 A | 7/1999 | Furuhashi et al. | | |
| 5,929,834 A * | 7/1999 | Inoue | G02F 1/13338 | 178/18.01 |
| 5,933,134 A * | 8/1999 | Shieh | G06F 3/0488 | 345/157 |
| 5,940,055 A * | 8/1999 | Lee | G09G 3/3677 | 345/205 |
| 5,940,064 A * | 8/1999 | Kai | G06F 3/0412 | 345/173 |
| 5,942,733 A * | 8/1999 | Allen | G06K 9/00335 | 178/18.01 |
| 5,943,043 A * | 8/1999 | Furuhata | G06F 3/045 | 345/173 |
| 5,943,044 A * | 8/1999 | Martinelli | G06F 3/03547 | 178/18.01 |
| 5,945,980 A * | 8/1999 | Moissev | G06F 3/044 | 178/18.01 |
| 5,952,998 A * | 9/1999 | Clancy | G06F 1/1616 | 345/173 |
| 5,955,198 A * | 9/1999 | Hashimoto | G06F 3/045 | 178/18.03 |
| 5,977,562 A | 11/1999 | Hirakata et al. | | |
| 5,977,957 A | 11/1999 | Miller et al. | | |
| 5,982,352 A * | 11/1999 | Pryor | G01S 5/16 | 345/156 |
| 5,986,723 A * | 11/1999 | Nakamura | G02F 1/1368 | 349/140 |
| 6,002,389 A * | 12/1999 | Kasser | G06F 3/041 | 178/18.01 |
| 6,002,808 A * | 12/1999 | Freeman | G06F 3/017 | 348/171 |
| 6,008,800 A * | 12/1999 | Pryor | G01S 5/16 | 345/173 |
| 6,020,881 A * | 2/2000 | Naughton | H04L 12/282 | 348/E5.102 |
| 6,020,945 A * | 2/2000 | Sawai | G02F 1/13338 | 345/104 |
| 6,023,265 A * | 2/2000 | Lee | G06F 3/044 | 345/173 |

(56) References Cited

U.S. PATENT DOCUMENTS

| | | | | |
|---|---|---|---|---|
| 6,028,581 A * | 2/2000 | Umeya | G02F 1/1368 | 345/104 |
| 6,029,214 A * | 2/2000 | Dorfman | G06F 3/03545 | 345/173 |
| 6,031,524 A * | 2/2000 | Kunert | G06F 3/0202 | 345/169 |
| 6,037,882 A * | 3/2000 | Levy | G06F 3/011 | 340/11.1 |
| 6,050,825 A * | 4/2000 | Nichol | G06F 3/0202 | 235/145 R |
| 6,052,339 A * | 4/2000 | Frenkel | G04B 25/02 | 368/230 |
| 6,057,903 A * | 5/2000 | Colgan | G02F 1/134309 | 345/173 |
| 6,061,177 A * | 5/2000 | Fujimoto | G06F 3/0425 | 345/175 |
| 6,072,494 A * | 6/2000 | Nguyen | G06F 3/017 | 345/156 |
| 6,079,282 A | 6/2000 | Lanter | | |
| 6,081,259 A * | 6/2000 | Teterwak | G06F 3/044 | 178/18.01 |
| 6,084,576 A * | 7/2000 | Leu | G06F 3/0219 | 341/22 |
| 6,107,654 A * | 8/2000 | Yamazaki | H01L 29/1054 | 257/194 |
| 6,107,997 A * | 8/2000 | Ure | G06F 3/0235 | 345/156 |
| 6,124,848 A * | 9/2000 | Ballare | G06F 3/044 | 178/18.02 |
| 6,128,003 A * | 10/2000 | Smith | G06K 9/00355 | 345/156 |
| 6,131,299 A * | 10/2000 | Raab | G01B 21/04 | 33/503 |
| 6,133,906 A | 10/2000 | Geaghan | | |
| 6,135,958 A * | 10/2000 | Mikula-Curtis | A61B 8/00 | 600/443 |
| 6,137,427 A | 10/2000 | Binstead | | |
| 6,144,380 A | 11/2000 | Shwarts et al. | | |
| 6,163,313 A * | 12/2000 | Aroyan | G06F 3/045 | 178/18.04 |
| 6,172,667 B1 * | 1/2001 | Sayag | G06F 3/0421 | 345/173 |
| 6,177,918 B1 | 1/2001 | Colgan et al. | | |
| 6,188,391 B1 * | 2/2001 | Seely | G06F 3/044 | 178/18.03 |
| 6,191,828 B1 * | 2/2001 | Kim | G06F 3/0412 | 345/174 |
| 6,198,515 B1 * | 3/2001 | Cole | H04N 5/645 | 312/7.2 |
| 6,204,897 B1 * | 3/2001 | Colgan | G02F 1/13338 | 349/111 |
| 6,208,329 B1 * | 3/2001 | Ballare | G06F 3/0488 | 345/173 |
| 6,211,585 B1 * | 4/2001 | Sato | G01D 7/00 | 310/257 |
| 6,222,465 B1 * | 4/2001 | Kumar | G06F 3/017 | 341/20 |
| 6,222,528 B1 | 4/2001 | Gerpheide et al. | | |
| 6,239,389 B1 * | 5/2001 | Allen | G06F 1/1626 | 178/18.01 |
| 6,239,788 B1 * | 5/2001 | Nohno | G06F 3/0412 | 178/18.03 |
| 6,239,790 B1 | 5/2001 | Martinelli et al. | | |
| 6,243,071 B1 | 6/2001 | Shwarts et al. | | |
| 6,246,862 B1 * | 6/2001 | Grivas | H04M 1/0202 | 455/566 |
| 6,249,606 B1 * | 6/2001 | Kiraly | G06F 3/04883 | 345/156 |
| 6,250,863 B1 | 6/2001 | Kamentser et al. | | |
| 6,259,490 B1 * | 7/2001 | Colgan | G02F 1/13338 | 349/12 |
| 6,271,835 B1 * | 8/2001 | Hoeksma | G06F 3/0236 | 345/168 |
| 6,285,428 B1 * | 9/2001 | Kim | G02F 1/134363 | 349/141 |
| 6,288,707 B1 * | 9/2001 | Philipp | G06F 3/0213 | 341/22 |
| 6,289,326 B1 * | 9/2001 | LaFleur | A47B 81/065 | 312/258 |
| 6,292,178 B1 * | 9/2001 | Bernstein | A61F 9/00736 | 345/173 |
| 6,297,811 B1 * | 10/2001 | Kent | G06F 3/044 | 178/18.01 |
| 6,310,610 B1 * | 10/2001 | Beaton | G06F 3/0488 | 345/173 |
| 6,317,248 B1 | 11/2001 | Agrawal et al. | | |
| 6,323,846 B1 * | 11/2001 | Westerman | G06F 3/0235 | 345/173 |
| 6,323,849 B1 * | 11/2001 | He | G09G 3/20 | 345/204 |
| 6,333,768 B1 | 12/2001 | Kawashima et al. | | |
| 6,337,678 B1 * | 1/2002 | Fish | G06F 3/011 | 345/156 |
| 6,342,938 B1 * | 1/2002 | Song | G02F 1/133707 | 349/143 |
| 6,347,290 B1 * | 2/2002 | Bartlett | G06F 1/1626 | 702/150 |
| 6,377,009 B1 * | 4/2002 | Philipp | E05F 15/46 | 318/266 |
| 6,380,931 B1 | 4/2002 | Gillespie et al. | | |
| 6,395,863 B2 | 5/2002 | Geaghan | | |
| 6,411,287 B1 * | 6/2002 | Scharff | G06F 3/043 | 277/654 |
| 6,414,671 B1 | 7/2002 | Gillespie et al. | | |
| 6,417,846 B1 * | 7/2002 | Lee | G06F 3/03545 | 178/18.01 |
| 6,421,039 B1 * | 7/2002 | Moon | G02F 1/134363 | 345/100 |
| 6,421,234 B1 * | 7/2002 | Ricks | G06F 1/1626 | 235/462.46 |
| 6,425,289 B1 * | 7/2002 | Igel | G01L 9/0073 | 73/715 |
| 6,452,514 B1 * | 9/2002 | Philipp | G01D 5/2405 | 178/18.06 |
| 6,456,350 B1 | 9/2002 | Ashizawa et al. | | |
| 6,457,355 B1 * | 10/2002 | Philipp | G01F 23/268 | 340/620 |
| 6,459,424 B1 * | 10/2002 | Resman | G06F 3/044 | 345/173 |
| 6,466,036 B1 * | 10/2002 | Philipp | G01D 5/24 | 324/658 |
| 6,483,498 B1 * | 11/2002 | Colgan | G06F 3/045 | 178/18.05 |
| 6,489,952 B1 | 12/2002 | Tanaka et al. | | |
| 6,492,599 B1 | 12/2002 | Sugihara | | |
| 6,501,528 B1 * | 12/2002 | Hamada | G02F 1/133305 | 345/4 |
| 6,501,529 B1 * | 12/2002 | Kurihara | G02F 1/13338 | 345/173 |
| 6,504,530 B1 * | 1/2003 | Wilson | G06F 3/0418 | 345/173 |
| 6,504,713 B1 * | 1/2003 | Pandolfi | G02F 1/13338 | 345/87 |
| 6,515,669 B1 * | 2/2003 | Mohri | G06F 3/014 | 345/418 |
| 6,522,772 B1 * | 2/2003 | Morrison | G06Q 20/208 | 235/383 |
| 6,525,547 B2 * | 2/2003 | Hayes | G01D 5/2405 | 324/662 |
| 6,525,749 B1 * | 2/2003 | Moran | G06F 3/04883 | 345/156 |
| 6,535,200 B2 * | 3/2003 | Philipp | G06F 3/0213 | 178/18.06 |
| 6,543,684 B1 * | 4/2003 | White | G06F 3/04886 | 235/379 |
| 6,543,947 B2 * | 4/2003 | Lee | G06F 3/0219 | 341/22 |

(56) References Cited

U.S. PATENT DOCUMENTS

| | | | |
|---|---|---|---|
| 6,545,495 B2 | 4/2003 | Warmack et al. | |
| 6,549,193 B1 * | 4/2003 | Huang | G06F 3/044 178/18.05 |
| 6,568,275 B2 | 5/2003 | Scholz et al. | |
| 6,570,557 B1 * | 5/2003 | Westerman | G06F 3/04883 341/22 |
| 6,593,916 B1 * | 7/2003 | Aroyan | G06F 3/045 345/173 |
| 6,602,790 B2 * | 8/2003 | Kian | G02F 1/133305 438/30 |
| 6,610,936 B2 | 8/2003 | Gillespie et al. | |
| 6,624,833 B1 * | 9/2003 | Kumar | G06F 3/017 345/156 |
| 6,624,835 B2 * | 9/2003 | Willig | G06F 3/0412 178/19.01 |
| 6,627,918 B2 | 9/2003 | Getz et al. | |
| 6,628,268 B1 * | 9/2003 | Harada | G06F 1/1626 345/173 |
| 6,639,577 B2 * | 10/2003 | Eberhard | G06F 1/1601 345/102 |
| D482,368 S * | 11/2003 | den Toonder | D14/486 |
| 6,650,319 B1 * | 11/2003 | Hurst | G06F 3/045 345/173 |
| 6,658,994 B1 * | 12/2003 | McMillan | A23L 3/3418 219/214 |
| 6,670,894 B2 * | 12/2003 | Mehring | G06F 3/014 341/22 |
| 6,670,951 B2 | 12/2003 | Clough et al. | |
| 6,677,932 B1 * | 1/2004 | Westerman | G06F 3/04886 345/168 |
| 6,677,934 B1 * | 1/2004 | Blanchard | G06F 3/0421 250/221 |
| 6,680,448 B2 * | 1/2004 | Kawashima | G06F 3/045 200/310 |
| 6,690,032 B1 | 2/2004 | Umetsu | |
| 6,690,387 B2 * | 2/2004 | Zimmerman | G06F 3/04883 345/684 |
| 6,721,375 B1 * | 4/2004 | Hammel | G01D 3/02 375/350 |
| 6,723,929 B2 | 4/2004 | Kent | |
| 6,724,366 B2 * | 4/2004 | Crawford | G06F 3/03547 345/156 |
| 6,757,002 B1 * | 6/2004 | Oross | G06F 3/03547 345/173 |
| 6,762,752 B2 | 7/2004 | Perski et al. | |
| 6,774,971 B2 | 8/2004 | Shirato et al. | |
| 6,784,948 B2 * | 8/2004 | Kawashima | G02F 1/13338 178/18.05 |
| 6,785,578 B2 | 8/2004 | Johnson et al. | |
| 6,803,906 B1 * | 10/2004 | Morrison | G06F 3/0428 178/18.01 |
| 6,825,833 B2 * | 11/2004 | Mulligan | G06F 3/044 178/18.06 |
| 6,842,672 B1 * | 1/2005 | Straub | G05D 1/0077 244/1 R |
| 6,846,579 B2 * | 1/2005 | Anderson | G06F 3/0412 428/212 |
| 6,856,259 B1 * | 2/2005 | Sharp | G06F 3/0488 178/18.01 |
| 6,876,355 B1 * | 4/2005 | Ahn | G02F 1/13394 345/173 |
| 6,888,536 B2 | 5/2005 | Westerman et al. | |
| 6,900,795 B1 * | 5/2005 | Knight, III | G06F 1/1609 178/18.01 |
| 6,906,692 B2 * | 6/2005 | Ishiyama | G09G 3/3614 345/209 |
| 6,909,532 B2 | 6/2005 | Chung et al. | |
| 6,924,789 B2 | 8/2005 | Bick | |
| 6,927,761 B2 * | 8/2005 | Badaye | G06F 3/041 345/173 |
| 6,927,763 B2 * | 8/2005 | La Monica | G06F 3/0233 178/18.06 |
| 6,942,571 B1 * | 9/2005 | McAllister | G07F 17/3209 463/20 |
| 6,943,779 B2 * | 9/2005 | Satoh | G06F 3/0423 178/18.01 |
| 6,947,102 B2 | 9/2005 | den Boer et al. | |
| 6,961,049 B2 * | 11/2005 | Mulligan | G06F 3/044 178/18.06 |
| 6,963,335 B2 | 11/2005 | Tanaka et al. | |
| 6,965,375 B1 * | 11/2005 | Gettemy | G06F 3/0412 178/18.03 |
| 6,970,160 B2 | 11/2005 | Mulligan et al. | |
| 6,972,401 B2 * | 12/2005 | Akitt | G06F 3/03547 250/216 |
| 6,977,666 B1 * | 12/2005 | Hedrick | G06F 3/14 345/502 |
| 6,982,432 B2 * | 1/2006 | Umemoto | G02F 1/13338 257/112 |
| 6,985,801 B1 * | 1/2006 | Straub | G01C 23/00 244/1 R |
| 6,992,659 B2 * | 1/2006 | Gettemy | G06F 3/0421 345/173 |
| 6,995,752 B2 | 2/2006 | Lu | |
| 7,006,064 B2 | 2/2006 | Enomoto et al. | |
| 7,009,663 B2 | 3/2006 | Abileah et al. | |
| 7,015,894 B2 * | 3/2006 | Morohoshi | G06F 3/03545 345/156 |
| 7,023,427 B2 * | 4/2006 | Kraus | G06F 3/0421 345/173 |
| 7,030,860 B1 * | 4/2006 | Hsu | G06F 3/044 178/18.06 |
| 7,031,228 B2 * | 4/2006 | Born | G04G 21/08 368/230 |
| 7,038,659 B2 * | 5/2006 | Rajkowski | G06F 3/0233 345/156 |
| 7,042,444 B2 * | 5/2006 | Cok | H01L 27/323 178/18.01 |
| 7,046,235 B2 * | 5/2006 | Katoh | G06F 3/0488 345/173 |
| 7,068,330 B2 | 6/2006 | Song et al. | |
| 7,088,342 B2 | 8/2006 | Rekimoto | |
| 7,088,343 B2 * | 8/2006 | Smith | G06F 1/1616 345/168 |
| 7,098,127 B2 * | 8/2006 | Ito | H01L 24/11 257/E23.021 |
| 7,098,897 B2 | 8/2006 | Vakil et al. | |
| 7,109,978 B2 | 9/2006 | Gillespie et al. | |
| 7,129,935 B2 | 10/2006 | Mackey | |
| 7,133,032 B2 * | 11/2006 | Cok | G06F 3/0412 345/175 |
| 7,138,984 B1 * | 11/2006 | Miles | G06F 3/0412 345/173 |
| 7,151,528 B2 * | 12/2006 | Taylor | G06F 3/0414 345/168 |
| 7,154,481 B2 | 12/2006 | Cross et al. | |
| 7,177,001 B2 * | 2/2007 | Lee | G02F 1/134363 349/129 |
| 7,184,064 B2 | 2/2007 | Zimmerman et al. | |
| 7,190,416 B2 * | 3/2007 | Paukshto | G02F 1/13338 349/101 |
| 7,202,856 B2 | 4/2007 | Cok | |
| 7,205,969 B2 | 4/2007 | Song | |
| 7,230,608 B2 * | 6/2007 | Cok | G06F 3/0421 345/173 |
| 7,254,775 B2 * | 8/2007 | Geaghan | G06F 3/0416 178/18.01 |
| 7,268,770 B1 * | 9/2007 | Takahata | G02F 1/13338 345/173 |
| 7,274,353 B2 * | 9/2007 | Chiu | G06F 3/044 345/156 |
| 7,280,167 B2 * | 10/2007 | Choi | G02F 1/13338 345/174 |
| 7,292,229 B2 * | 11/2007 | Morag | G06F 3/03545 178/18.07 |
| 7,307,231 B2 * | 12/2007 | Matsumoto | G06F 3/0412 200/512 |
| 7,319,448 B2 | 1/2008 | Kim et al. | |

(56) References Cited

U.S. PATENT DOCUMENTS

| | | | |
|---|---|---|---|
| RE40,153 E * | 3/2008 | Westerman | G06F 3/04883 341/22 |
| 7,339,579 B2 * | 3/2008 | Richter | G06F 3/044 178/18.01 |
| 7,355,592 B2 * | 4/2008 | Hong | G06F 3/044 178/18.06 |
| 7,362,313 B2 * | 4/2008 | Geaghan | G06F 3/0488 345/100 |
| 7,372,455 B2 | 5/2008 | Perski et al. | |
| 7,379,054 B2 | 5/2008 | Lee | |
| 7,453,444 B2 * | 11/2008 | Geaghan | G06F 3/0416 345/156 |
| 7,463,246 B2 | 12/2008 | Mackey | |
| 7,483,016 B1 | 1/2009 | Gettemy et al. | |
| 7,511,702 B2 | 3/2009 | Hotelling | |
| 7,538,760 B2 | 5/2009 | Hotelling et al. | |
| 7,554,624 B2 * | 6/2009 | Kusuda | G06F 1/1626 349/58 |
| 7,633,484 B2 * | 12/2009 | Ito | G06F 3/0412 345/104 |
| 7,663,583 B2 | 2/2010 | Lee et al. | |
| 7,663,607 B2 | 2/2010 | Hotelling et al. | |
| 7,683,888 B1 | 3/2010 | Kennedy | |
| 7,688,315 B1 * | 3/2010 | Gettemy | G06F 1/1643 178/18.06 |
| 7,692,729 B2 | 4/2010 | Pak et al. | |
| 7,705,813 B2 | 4/2010 | Hong | |
| 7,705,834 B2 * | 4/2010 | Swedin | G02F 1/13338 178/18.05 |
| 7,730,401 B2 | 6/2010 | Gillespie et al. | |
| 7,737,957 B2 | 6/2010 | Lee et al. | |
| 7,742,041 B2 | 6/2010 | Lee et al. | |
| 7,746,326 B2 * | 6/2010 | Sato | G06F 3/0421 178/18.01 |
| 7,755,683 B2 * | 7/2010 | Sergio | G01D 5/24 250/208.1 |
| 7,800,589 B2 * | 9/2010 | Hurst | G06F 3/044 178/18.01 |
| 7,812,828 B2 | 10/2010 | Westerman et al. | |
| 7,843,439 B2 | 11/2010 | Perski et al. | |
| 7,868,875 B2 | 1/2011 | Park et al. | |
| 7,920,129 B2 * | 4/2011 | Hotelling | G06F 3/0416 345/173 |
| 7,924,253 B2 | 4/2011 | Huang et al. | |
| 8,031,180 B2 | 10/2011 | Miyamoto et al. | |
| 8,040,326 B2 | 10/2011 | Hotelling et al. | |
| 8,125,463 B2 | 2/2012 | Hotelling et al. | |
| 8,130,209 B2 | 3/2012 | Chang | |
| 8,228,274 B2 | 7/2012 | Chung et al. | |
| 8,243,027 B2 | 8/2012 | Hotelling et al. | |
| 8,253,692 B2 | 8/2012 | Lai | |
| 8,259,078 B2 | 9/2012 | Hotelling et al. | |
| 8,274,492 B2 | 9/2012 | Hotelling et al. | |
| 8,310,427 B2 | 11/2012 | Sheu | |
| 8,368,630 B2 | 2/2013 | Lee et al. | |
| 8,400,406 B1 | 3/2013 | Kurtz et al. | |
| 8,416,209 B2 | 4/2013 | Hotelling et al. | |
| 8,421,760 B2 | 4/2013 | Liu et al. | |
| 8,432,371 B2 | 4/2013 | Hotelling et al. | |
| 8,451,234 B2 | 5/2013 | Sato et al. | |
| 8,451,244 B2 | 5/2013 | Hotelling et al. | |
| 8,479,122 B2 | 7/2013 | Hotelling et al. | |
| 8,487,890 B2 | 7/2013 | Juan et al. | |
| 8,493,330 B2 | 7/2013 | Krah | |
| 8,502,799 B2 | 8/2013 | Hotelling et al. | |
| 8,508,244 B2 | 8/2013 | Seguine | |
| 8,552,989 B2 | 10/2013 | Hotelling et al. | |
| 8,553,013 B2 | 10/2013 | Kim | |
| 8,605,051 B2 | 12/2013 | Hotelling et al. | |
| 8,654,083 B2 | 2/2014 | Hotelling et al. | |
| 8,698,777 B2 | 4/2014 | Endo et al. | |
| 8,866,787 B2 | 10/2014 | Chang et al. | |
| 8,872,785 B2 | 10/2014 | Hotelling et al. | |
| 8,922,520 B2 | 12/2014 | Chen | |
| 8,928,618 B2 | 1/2015 | Hotelling et al. | |
| 8,933,351 B2 | 1/2015 | Noguchi et al. | |
| 8,982,087 B2 | 3/2015 | Hotelling et al. | |
| 9,025,090 B2 | 5/2015 | Chang et al. | |
| 9,030,452 B2 | 5/2015 | Jang et al. | |
| 9,035,202 B2 | 5/2015 | Mizuhashi et al. | |
| 9,035,907 B2 | 5/2015 | Hotelling et al. | |
| 9,244,561 B2 | 1/2016 | Hotelling et al. | |
| 9,268,429 B2 | 2/2016 | Hotelling et al. | |
| 9,454,277 B2 | 9/2016 | Hotelling et al. | |
| 9,575,610 B2 | 2/2017 | Hotelling et al. | |
| 9,710,095 B2 | 7/2017 | Hotelling et al. | |
| 9,971,459 B2 | 5/2018 | Youngs | |
| 10,191,576 B2 | 1/2019 | Hotelling et al. | |
| 2001/0000961 A1 * | 5/2001 | Hikida | G02F 1/1333 345/173 |
| 2001/0020578 A1 * | 9/2001 | Baier | H03K 17/96 200/600 |
| 2001/0020986 A1 * | 9/2001 | Ikeda | G02F 1/13338 349/12 |
| 2001/0020987 A1 * | 9/2001 | Ahn | G02F 1/13338 349/12 |
| 2001/0023204 A1 | 9/2001 | Komata | |
| 2002/0015024 A1 | 2/2002 | Westerman et al. | |
| 2002/0018035 A1 | 2/2002 | Song et al. | |
| 2002/0021398 A1 | 2/2002 | Matsumoto | |
| 2002/0033919 A1 | 3/2002 | Sanelle et al. | |
| 2002/0041356 A1 * | 4/2002 | Tanada | G02F 1/133305 349/158 |
| 2002/0049070 A1 * | 4/2002 | Bick | G06F 3/0202 455/550.1 |
| 2002/0063674 A1 | 5/2002 | Chiang | |
| 2002/0084922 A1 * | 7/2002 | Yagi | H03M 7/40 341/67 |
| 2002/0089496 A1 * | 7/2002 | Numao | G09G 3/3258 345/204 |
| 2002/0101410 A1 * | 8/2002 | Sakata | G06F 3/044 345/173 |
| 2002/0118848 A1 * | 8/2002 | Karpenstein | H04H 60/04 381/119 |
| 2002/0121146 A1 | 9/2002 | Manaresi et al. | |
| 2002/0140649 A1 * | 10/2002 | Aoyama | G02F 1/134363 345/87 |
| 2002/0149571 A1 | 10/2002 | Roberts | |
| 2002/0150336 A1 | 10/2002 | Davis et al. | |
| 2002/0158637 A1 | 10/2002 | Warmack et al. | |
| 2002/0159015 A1 * | 10/2002 | Seo | G02F 1/134363 349/141 |
| 2002/0167489 A1 * | 11/2002 | Davis | G06F 3/03547 345/157 |
| 2002/0185981 A1 * | 12/2002 | Dietz | G06F 3/038 315/169.3 |
| 2002/0185999 A1 * | 12/2002 | Tajima | G06F 3/011 324/76.75 |
| 2002/0186210 A1 * | 12/2002 | Itoh | G06F 3/0418 345/173 |
| 2002/0190964 A1 * | 12/2002 | Van Berkel | G06F 3/041 345/173 |
| 2002/0191029 A1 * | 12/2002 | Gillespie | G06F 3/0481 715/810 |
| 2002/0192445 A1 * | 12/2002 | Ezzell | C08G 73/10 428/212 |
| 2002/0196237 A1 * | 12/2002 | Fernando | G06F 21/83 345/173 |
| 2003/0006974 A1 * | 1/2003 | Clough | G06F 1/1626 345/179 |
| 2003/0026513 A1 | 2/2003 | Deliwala | |
| 2003/0035479 A1 * | 2/2003 | Kan | G06K 9/342 375/240.12 |
| 2003/0052867 A1 | 3/2003 | Shigetaka et al. | |
| 2003/0067451 A1 * | 4/2003 | Tagg | G01V 3/088 345/174 |
| 2003/0069653 A1 * | 4/2003 | Johnson | A61B 6/00 700/83 |
| 2003/0076301 A1 * | 4/2003 | Tsuk | G06F 1/1626 345/159 |

(56) References Cited

U.S. PATENT DOCUMENTS

| | | | |
|---|---|---|---|
| 2003/0076303 A1* | 4/2003 | Huppi | G06F 3/03543 345/163 |
| 2003/0076306 A1* | 4/2003 | Zadesky | G06F 1/1626 345/173 |
| 2003/0085882 A1* | 5/2003 | Lu | G06F 3/0414 345/173 |
| 2003/0095091 A1 | 5/2003 | Enomoto et al. | |
| 2003/0095095 A1* | 5/2003 | Pihlaja | G06F 1/1626 345/156 |
| 2003/0095096 A1* | 5/2003 | Robbin | G06F 1/1626 345/156 |
| 2003/0098858 A1* | 5/2003 | Perski | G06F 3/0416 345/173 |
| 2003/0132950 A1 | 7/2003 | Surucu et al. | |
| 2003/0151600 A1* | 8/2003 | Takeuchi | G06F 1/1626 345/204 |
| 2003/0174128 A1* | 9/2003 | Matsufusa | G06F 3/0412 345/205 |
| 2003/0174272 A1 | 9/2003 | Shirato et al. | |
| 2003/0179323 A1* | 9/2003 | Abileah | G02F 1/13338 349/24 |
| 2003/0201984 A1* | 10/2003 | Falvo | G06F 3/04842 345/173 |
| 2003/0206162 A1* | 11/2003 | Roberts | G06F 3/0414 345/173 |
| 2003/0206202 A1* | 11/2003 | Moriya | G06F 1/1626 715/846 |
| 2003/0214485 A1 | 11/2003 | Roberts | |
| 2003/0214486 A1 | 11/2003 | Roberts | |
| 2003/0222857 A1* | 12/2003 | Abileah | G02F 1/13338 345/173 |
| 2003/0234768 A1* | 12/2003 | Rekimoto | G06F 1/1626 345/169 |
| 2003/0234769 A1* | 12/2003 | Cross | G06F 3/0412 345/173 |
| 2003/0234770 A1* | 12/2003 | MacKey | G06F 3/044 345/173 |
| 2004/0021663 A1 | 2/2004 | Suzuki et al. | |
| 2004/0022010 A1* | 2/2004 | Shigetaka | G06F 3/03547 361/306.3 |
| 2004/0056839 A1* | 3/2004 | Yoshihara | B60K 35/00 345/156 |
| 2004/0080501 A1* | 4/2004 | Koyama | G09G 3/20 345/204 |
| 2004/0090429 A1* | 5/2004 | Geaghan | G06F 3/03547 345/173 |
| 2004/0095335 A1* | 5/2004 | Oh | G06F 3/044 345/173 |
| 2004/0109097 A1* | 6/2004 | Mai | G02F 1/13338 349/12 |
| 2004/0119701 A1* | 6/2004 | Mulligan | G06F 3/044 345/173 |
| 2004/0141096 A1* | 7/2004 | Mai | G02F 1/13338 349/12 |
| 2004/0150629 A1* | 8/2004 | Lee | G06F 3/041 345/173 |
| 2004/0155871 A1* | 8/2004 | Perski | G06F 3/041 345/174 |
| 2004/0155991 A1* | 8/2004 | Lowles | G02F 1/13306 349/12 |
| 2004/0165005 A1* | 8/2004 | Yoshikawa | G06F 3/041 715/702 |
| 2004/0169625 A1 | 9/2004 | Park et al. | |
| 2004/0183076 A1* | 9/2004 | Yamazaki | G02F 1/133305 257/72 |
| 2004/0183484 A1 | 9/2004 | Ide et al. | |
| 2004/0188150 A1* | 9/2004 | Richard | G06F 3/041 178/18.01 |
| 2004/0189587 A1* | 9/2004 | Jung | G02F 1/13338 345/102 |
| 2004/0189612 A1* | 9/2004 | Bottari | G06F 3/041 345/173 |
| 2004/0196266 A1 | 10/2004 | Matsuura et al. | |
| 2004/0206190 A1 | 10/2004 | Kawahata | |
| 2004/0217945 A1* | 11/2004 | Miyamoto | G06F 3/0412 345/173 |
| 2004/0227736 A1* | 11/2004 | Kamrath | G01L 1/142 345/173 |
| 2004/0239650 A1* | 12/2004 | Mackey | G06F 3/044 345/174 |
| 2004/0243747 A1* | 12/2004 | Rekimoto | G06F 3/023 710/72 |
| 2004/0263484 A1* | 12/2004 | Mantysalo | G06F 1/1616 345/173 |
| 2004/0263743 A1 | 12/2004 | Kim et al. | |
| 2005/0005703 A1 | 1/2005 | Saito et al. | |
| 2005/0007349 A1* | 1/2005 | Vakil | H04M 1/0222 345/173 |
| 2005/0012723 A1* | 1/2005 | Pallakoff | G06F 1/1616 345/173 |
| 2005/0017737 A1* | 1/2005 | Yakabe | G01R 27/26 324/686 |
| 2005/0046621 A1* | 3/2005 | Kaikuranta | G06F 3/03547 345/173 |
| 2005/0052425 A1* | 3/2005 | Zadesky | G06F 3/0338 345/173 |
| 2005/0052427 A1* | 3/2005 | Wu | G06F 3/04883 345/173 |
| 2005/0052582 A1* | 3/2005 | Mai | G02F 1/13338 349/12 |
| 2005/0062620 A1* | 3/2005 | Schaefer | H01H 13/702 341/22 |
| 2005/0073507 A1* | 4/2005 | Richter | G06F 3/044 345/174 |
| 2005/0083307 A1* | 4/2005 | Aufderheide | G06F 3/044 345/173 |
| 2005/0094038 A1 | 5/2005 | Choi et al. | |
| 2005/0099402 A1* | 5/2005 | Nakanishi | G06F 3/0412 345/173 |
| 2005/0104867 A1 | 5/2005 | Westerman et al. | |
| 2005/0110768 A1* | 5/2005 | Marriott | G06F 3/03547 345/173 |
| 2005/0139837 A1 | 6/2005 | Lee et al. | |
| 2005/0140620 A1 | 6/2005 | Aoyama et al. | |
| 2005/0140634 A1 | 6/2005 | Takatori | |
| 2005/0146511 A1* | 7/2005 | Hill | G06F 3/0433 345/173 |
| 2005/0162402 A1* | 7/2005 | Watanachote | G06F 3/03547 345/173 |
| 2005/0170668 A1* | 8/2005 | Park | C23C 16/4412 438/789 |
| 2005/0231487 A1* | 10/2005 | Ming | G02F 1/13338 345/173 |
| 2005/0237439 A1* | 10/2005 | Mai | G06F 1/182 349/12 |
| 2005/0243023 A1* | 11/2005 | Reddy | G09G 3/2011 345/48 |
| 2006/0007087 A1* | 1/2006 | Choi | G02F 1/133371 345/88 |
| 2006/0007165 A1* | 1/2006 | Yang | G06F 3/0412 345/173 |
| 2006/0012575 A1* | 1/2006 | Knapp | G02F 1/13338 345/173 |
| 2006/0017710 A1* | 1/2006 | Lee | G02F 1/13338 345/173 |
| 2006/0022955 A1* | 2/2006 | Kennedy | G06F 3/0414 345/173 |
| 2006/0022956 A1* | 2/2006 | Lengeling | G06F 3/04847 345/173 |
| 2006/0026535 A1 | 2/2006 | Hotelling et al. | |
| 2006/0026536 A1* | 2/2006 | Hotelling | G06F 3/0418 715/863 |
| 2006/0032680 A1* | 2/2006 | Elias | G06F 3/044 178/18.06 |
| 2006/0033724 A1* | 2/2006 | Chaudhri | G06F 3/0482 345/173 |
| 2006/0044259 A1* | 3/2006 | Hotelling | G06F 1/1616 345/156 |

(56) References Cited

U.S. PATENT DOCUMENTS

| | | | |
|---|---|---|---|
| 2006/0053387 A1* | 3/2006 | Ording | G06F 3/04883 715/773 |
| 2006/0066582 A1* | 3/2006 | Lyon | G06F 3/0488 345/173 |
| 2006/0085757 A1* | 4/2006 | Andre | G06F 3/041 715/771 |
| 2006/0087482 A1 | 4/2006 | Utsumi et al. | |
| 2006/0109222 A1* | 5/2006 | Lee | G02F 1/13338 345/88 |
| 2006/0114247 A1 | 6/2006 | Brown | |
| 2006/0132462 A1* | 6/2006 | Geaghan | G06F 3/044 345/173 |
| 2006/0145365 A1* | 7/2006 | Halls | B82Y 10/00 347/238 |
| 2006/0145983 A1* | 7/2006 | Lee | G09G 3/3648 345/92 |
| 2006/0145987 A1 | 7/2006 | Hong | |
| 2006/0146033 A1* | 7/2006 | Chen | G02F 1/13338 345/173 |
| 2006/0146034 A1* | 7/2006 | Chen | G02F 1/13338 345/173 |
| 2006/0146038 A1 | 7/2006 | Parkg et al. | |
| 2006/0192745 A1 | 8/2006 | Yamazaki | |
| 2006/0197753 A1* | 9/2006 | Hotelling | G06F 1/1626 345/173 |
| 2006/0208985 A1 | 9/2006 | Hwang et al. | |
| 2006/0227114 A1* | 10/2006 | Geaghan | G06F 3/0418 345/173 |
| 2006/0232564 A1* | 10/2006 | Nishimura | G06F 1/18 345/173 |
| 2006/0232567 A1 | 10/2006 | Westerman et al. | |
| 2006/0238517 A1* | 10/2006 | King | G06F 1/1626 345/173 |
| 2006/0238518 A1 | 10/2006 | Westerman et al. | |
| 2006/0238519 A1 | 10/2006 | Westerman et al. | |
| 2006/0238520 A1 | 10/2006 | Westerman et al. | |
| 2006/0238521 A1 | 10/2006 | Westerman et al. | |
| 2006/0238522 A1 | 10/2006 | Westerman et al. | |
| 2006/0244736 A1* | 11/2006 | Tseng | G06F 3/0412 345/173 |
| 2006/0262100 A1 | 11/2006 | Van Berkel | |
| 2006/0278444 A1* | 12/2006 | Binstead | G06F 3/044 178/18.06 |
| 2006/0279679 A1* | 12/2006 | Fujisawa | G02B 5/0221 349/116 |
| 2006/0284857 A1 | 12/2006 | Oh | |
| 2006/0290863 A1* | 12/2006 | HoeSup | G02F 1/134363 349/141 |
| 2007/0013678 A1* | 1/2007 | Nakajima | G06F 3/045 345/174 |
| 2007/0018969 A1* | 1/2007 | Chen | G02F 1/13338 345/173 |
| 2007/0027932 A1* | 2/2007 | Thibeault | G06F 16/958 |
| 2007/0062739 A1* | 3/2007 | Philipp | G06F 3/044 178/18.06 |
| 2007/0075977 A1* | 4/2007 | Chen | G06F 3/0416 345/173 |
| 2007/0085838 A1* | 4/2007 | Ricks | G06F 3/0412 345/173 |
| 2007/0109274 A1* | 5/2007 | Reynolds | G06F 3/041 345/173 |
| 2007/0132739 A1 | 6/2007 | Felder | |
| 2007/0152976 A1* | 7/2007 | Townsend | G06F 3/0416 345/173 |
| 2007/0159561 A1* | 7/2007 | Chien | G02F 1/13338 349/12 |
| 2007/0176905 A1* | 8/2007 | Shih | G02F 1/13338 345/173 |
| 2007/0182706 A1* | 8/2007 | Cassidy | G02B 5/0808 345/107 |
| 2007/0216657 A1* | 9/2007 | Konicek | G06F 3/0412 345/173 |
| 2007/0229464 A1* | 10/2007 | Hotelling | G06F 3/0414 345/173 |
| 2007/0229479 A1 | 10/2007 | Choo et al. | |
| 2007/0236466 A1* | 10/2007 | Hotelling | G06F 3/0414 345/173 |
| 2007/0242055 A1 | 10/2007 | Lai | |
| 2007/0247429 A1* | 10/2007 | Westerman | G06F 3/0219 345/168 |
| 2007/0257890 A1* | 11/2007 | Hotelling | G06F 3/044 345/173 |
| 2007/0262967 A1* | 11/2007 | Rho | G02F 1/13338 345/173 |
| 2008/0007538 A1 | 1/2008 | Kotera et al. | |
| 2008/0048994 A1* | 2/2008 | Lee | G06F 3/0412 345/173 |
| 2008/0055221 A1* | 3/2008 | Yabuta | G02F 1/13338 345/90 |
| 2008/0055268 A1* | 3/2008 | Yoo | G06F 3/0412 345/173 |
| 2008/0055270 A1* | 3/2008 | Cho | G06F 3/045 345/173 |
| 2008/0055495 A1 | 3/2008 | Cernasov | |
| 2008/0062140 A1* | 3/2008 | Hotelling | G09G 3/3648 345/173 |
| 2008/0062148 A1* | 3/2008 | Hotelling | G02F 1/13338 345/174 |
| 2008/0067528 A1 | 3/2008 | Choi et al. | |
| 2008/0074401 A1* | 3/2008 | Chung | G02F 1/1368 345/175 |
| 2008/0079697 A1* | 4/2008 | Lee | G06F 3/0412 345/173 |
| 2008/0129317 A1* | 6/2008 | Oba | G06F 3/044 324/663 |
| 2008/0129898 A1* | 6/2008 | Moon | G02F 1/13338 349/12 |
| 2008/0131624 A1* | 6/2008 | Egami | G06F 3/045 428/1.1 |
| 2008/0136980 A1* | 6/2008 | Rho | G02F 1/13338 349/12 |
| 2008/0150901 A1* | 6/2008 | Lowles | G02F 1/13338 345/173 |
| 2008/0157867 A1* | 7/2008 | Krah | G06F 3/044 329/304 |
| 2008/0158167 A1* | 7/2008 | Hotelling | G06F 3/0416 345/173 |
| 2008/0158181 A1* | 7/2008 | Hamblin | G06F 3/0416 345/173 |
| 2008/0165158 A1* | 7/2008 | Hotelling | G06F 3/044 345/174 |
| 2008/0165299 A1 | 7/2008 | Huang et al. | |
| 2008/0186288 A1* | 8/2008 | Chang | G06F 3/0412 345/174 |
| 2008/0273014 A1 | 11/2008 | Lowles et al. | |
| 2008/0284927 A1 | 11/2008 | Sakamoto et al. | |
| 2008/0284928 A1 | 11/2008 | Sakamoto et al. | |
| 2008/0297476 A1* | 12/2008 | Hotelling | G06F 21/32 345/163 |
| 2008/0309627 A1 | 12/2008 | Hotelling et al. | |
| 2009/0058785 A1 | 3/2009 | Kim et al. | |
| 2009/0066670 A1* | 3/2009 | Hotelling | G06F 3/0416 345/174 |
| 2009/0090694 A1* | 4/2009 | Hotelling | G06F 3/044 216/41 |
| 2009/0096757 A1 | 4/2009 | Hotelling et al. | |
| 2009/0096759 A1 | 4/2009 | Nishiwaki et al. | |
| 2009/0102991 A1 | 4/2009 | Chen et al. | |
| 2009/0115743 A1* | 5/2009 | Oowaki | G06F 3/0412 345/174 |
| 2009/0160816 A1 | 6/2009 | Westerman et al. | |
| 2009/0179875 A1 | 7/2009 | Li et al. | |
| 2009/0262061 A1 | 10/2009 | Chung et al. | |
| 2009/0273581 A1* | 11/2009 | Kim | G02F 1/13338 345/175 |
| 2009/0279006 A1 | 11/2009 | Chien et al. | |
| 2009/0303193 A1* | 12/2009 | Lim | G06F 3/0416 345/173 |
| 2009/0322660 A1 | 12/2009 | Chung et al. | |

(56) References Cited

U.S. PATENT DOCUMENTS

| | | | |
|---|---|---|---|
| 2010/0033448 A1 | 2/2010 | Takeo et al. | |
| 2010/0045632 A1 | 2/2010 | Yilmaz | |
| 2010/0066650 A1* | 3/2010 | Lee | G02F 1/13338 345/64 |
| 2010/0103121 A1* | 4/2010 | Kim | G02F 1/13394 345/173 |
| 2010/0110057 A1 | 5/2010 | Lee et al. | |
| 2010/0182273 A1* | 7/2010 | Noguchi | G02F 1/13338 345/174 |
| 2010/0188347 A1* | 7/2010 | Mizuhashi | G02F 1/13338 345/173 |
| 2010/0194698 A1* | 8/2010 | Hotelling | G06F 1/3218 345/173 |
| 2010/0194699 A1 | 8/2010 | Chang | |
| 2010/0238134 A1* | 9/2010 | Day | G06F 3/0412 345/174 |
| 2010/0289770 A1* | 11/2010 | Lee | G06F 3/044 345/174 |
| 2011/0032241 A1 | 2/2011 | Jeong et al. | |
| 2011/0139516 A1 | 6/2011 | Nirmal | |
| 2011/0187677 A1* | 8/2011 | Hotelling | G06F 3/0412 345/174 |
| 2012/0026132 A1 | 2/2012 | Hotelling et al. | |
| 2012/0038585 A1 | 2/2012 | Kim | |
| 2012/0133858 A1 | 5/2012 | Shin et al. | |
| 2012/0162584 A1* | 6/2012 | Chang | G06F 3/0412 349/106 |
| 2013/0082964 A1 | 4/2013 | Agari et al. | |
| 2013/0176276 A1 | 7/2013 | Shepleve | |
| 2013/0293484 A1 | 11/2013 | Singh et al. | |
| 2014/0240286 A1 | 8/2014 | Chang et al. | |
| 2014/0300578 A1 | 10/2014 | Hotelling | |
| 2015/0192815 A1 | 7/2015 | Chang et al. | |
| 2015/0309627 A1 | 10/2015 | Xu et al. | |
| 2017/0010746 A1 | 1/2017 | Hotelling et al. | |
| 2017/0010750 A1 | 1/2017 | Hotelling et al. | |

FOREIGN PATENT DOCUMENTS

| | | |
|---|---|---|
| CA | 2 318 815 A1 | 7/1999 |
| CA | 2494353 A1 | 2/2004 |
| CN | 1453623 A | 11/2003 |
| CN | 1867882 A | 11/2006 |
| CN | 101241277 A | 8/2008 |
| DE | 197 06 168 | 8/1998 |
| DE | 102 51 296 A1 | 5/2004 |
| EP | 0 156 593 A2 | 10/1985 |
| EP | 0 156 593 A3 | 10/1985 |
| EP | 0 178 590 A2 | 4/1986 |
| EP | 0 250 931 A2 | 1/1988 |
| EP | 0 250 931 A3 | 1/1988 |
| EP | 0 250 931 B1 | 1/1988 |
| EP | 0 332 365 A1 | 9/1989 |
| EP | 0 464 908 A2 | 1/1992 |
| EP | 0 464 908 A3 | 1/1992 |
| EP | 0 464 908 B1 | 1/1992 |
| EP | 0 467 562 A2 | 1/1992 |
| EP | 0 483 519 A1 | 5/1992 |
| EP | 0 288 692 A2 | 7/1993 |
| EP | 0 288 692 A3 | 7/1993 |
| EP | 0 288 692 B1 | 7/1993 |
| EP | 0 664 504 A2 | 7/1995 |
| EP | 0 770 971 A2 | 5/1997 |
| EP | 0 786 745 A2 | 7/1997 |
| EP | 0 786 745 A3 | 7/1997 |
| EP | 0 786 745 B1 | 7/1997 |
| EP | 0 932 117 A2 | 7/1999 |
| EP | 0 932 117 A3 | 7/1999 |
| EP | 0 932 117 B1 | 7/1999 |
| EP | 0 973 123 A1 | 1/2000 |
| EP | 1 014 295 A2 | 1/2002 |
| EP | 1 014 295 A3 | 1/2002 |
| EP | 1 211 633 A1 | 6/2002 |
| EP | 1 211 633 B1 | 6/2002 |
| EP | 1 322 104 A1 | 6/2003 |
| EP | 1 391 807 A1 | 2/2004 |
| EP | 1 396 812 A2 | 3/2004 |
| EP | 1 396 812 A3 | 3/2004 |
| EP | 1 418 491 A2 | 5/2004 |
| EP | 1 418 491 A3 | 5/2004 |
| EP | 1 422 601 A1 | 5/2004 |
| EP | 1 455 264 A2 | 9/2004 |
| EP | 1 455 264 A3 | 9/2004 |
| EP | 1 469 415 A2 | 10/2004 |
| EP | 2 214 084 A1 | 4/2010 |
| EP | 2 267 584 A1 | 12/2010 |
| GB | 1 486 988 A | 9/1977 |
| GB | 2 168 816 A | 6/1986 |
| GB | 2 313 195 A | 11/1997 |
| GB | 2 330 670 A | 4/1999 |
| GB | 2 345 140 A | 6/2000 |
| GB | 2 368 483 A | 7/2004 |
| JP | 53-147626 A2 | 11/1978 |
| JP | 58-166430 A | 10/1983 |
| JP | 59-214941 A | 12/1984 |
| JP | 60-123927 A | 7/1985 |
| JP | 60-211529 A | 10/1985 |
| JP | 61-131314 A | 6/1986 |
| JP | 63-279316 A | 11/1988 |
| JP | 02-030024 A | 1/1990 |
| JP | 03-180922 A | 8/1991 |
| JP | 03-294918 A | 12/1991 |
| JP | H-03-289715 A | 12/1991 |
| JP | 04-127314 A | 4/1992 |
| JP | 05-053726 | 3/1993 |
| JP | 05-063914 A | 3/1993 |
| JP | 05-080923 A | 4/1993 |
| JP | 05-224818 A | 9/1993 |
| JP | 06-161661 A | 6/1994 |
| JP | 07-036017 A | 2/1995 |
| JP | 07-044305 A | 2/1995 |
| JP | 07-110741 A | 4/1995 |
| JP | 07-141086 A | 6/1995 |
| JP | H07-261932 A | 10/1995 |
| JP | 08-016307 A | 1/1996 |
| JP | 08-147092 A | 6/1996 |
| JP | 08-242458 A | 9/1996 |
| JP | H-08-249106 A | 9/1996 |
| JP | 08-297267 A | 11/1996 |
| JP | 09-054650 A | 2/1997 |
| JP | 09-091079 A | 4/1997 |
| JP | 09-096792 A | 4/1997 |
| JP | 09-212302 A | 8/1997 |
| JP | 09-292950 A | 11/1997 |
| JP | 09-325852 A | 12/1997 |
| JP | 10-003349 A | 1/1998 |
| JP | H10269020 A | 10/1998 |
| JP | 11-145141 A | 5/1999 |
| JP | 11-505641 A | 5/1999 |
| JP | 11-249813 A | 9/1999 |
| JP | 2000-105670 A | 4/2000 |
| JP | 2000-112642 A | 4/2000 |
| JP | 2000-163031 A | 6/2000 |
| JP | 2000-172437 A | 6/2000 |
| JP | 2000-172447 A | 6/2000 |
| JP | 2000-221932 A | 8/2000 |
| JP | 2001-075079 A | 3/2001 |
| JP | 2001-283228 A | 10/2001 |
| JP | 2002-501271 A | 1/2002 |
| JP | 2002-116017 A | 4/2002 |
| JP | 2002-259052 A | 9/2002 |
| JP | 2002-287660 A | 10/2002 |
| JP | 2002-342014 A | 11/2002 |
| JP | 2002-342033 A | 11/2002 |
| JP | 2002-366304 A | 12/2002 |
| JP | 2003-029899 A | 1/2003 |
| JP | 2003-066417 A | 3/2003 |
| JP | 2003-099192 A | 4/2003 |
| JP | 2003-516015 A | 5/2003 |
| JP | 2003-173237 A | 6/2003 |
| JP | 2003-185688 A | 7/2003 |
| JP | 2003-196023 A | 7/2003 |
| JP | 2003-249738 A | 9/2003 |

(56) References Cited

FOREIGN PATENT DOCUMENTS

| | | |
|---|---|---|
| JP | 2003-255855 A | 9/2003 |
| JP | 2004-038919 A | 2/2004 |
| JP | 2004-102985 A | 4/2004 |
| JP | 2004-186333 A | 7/2004 |
| JP | 2004-526990 A | 9/2004 |
| JP | 2005-346047 A | 12/2005 |
| JP | 2006-134915 A | 5/2006 |
| JP | 2007-533044 A | 11/2007 |
| JP | 2008-032756 A | 2/2008 |
| JP | 2009-244958 A | 10/2009 |
| JP | 2010-231773 A | 10/2010 |
| KR | 10-0226812 B1 | 7/1999 |
| KR | 10-2003-0028973 A | 4/2003 |
| KR | 10-2004-0002310 A | 1/2004 |
| KR | 10-2004-0013029 A | 2/2004 |
| KR | 10-2004-0022243 A | 3/2004 |
| KR | 10-2005-0019799 A | 3/2005 |
| KR | 10-0493921 B1 | 6/2005 |
| KR | 10-2006-0089645 | 8/2006 |
| KR | 10-0887775 B1 | 3/2009 |
| KR | 10-2010-0127164 A | 12/2010 |
| KR | 10-2009-0004678 | 1/2012 |
| TW | 200302778 A | 8/2003 |
| TW | 2004-21156 | 10/2004 |
| TW | 200529441 A | 9/2005 |
| TW | 201009662 A | 3/2010 |
| TW | 201030588 A | 8/2010 |
| TW | 201042315 A | 12/2010 |
| WO | WO-87/04553 A1 | 7/1987 |
| WO | WO-92/13328 A1 | 8/1992 |
| WO | WO-96/15464 A1 | 5/1996 |
| WO | WO-96/18179 A1 | 6/1996 |
| WO | WO-1996/038833 A1 | 12/1996 |
| WO | WO-97/018547 A1 | 5/1997 |
| WO | WO-1997/018528 A1 | 5/1997 |
| WO | WO-97/023738 A1 | 7/1997 |
| WO | WO-1997/023738 A1 | 7/1997 |
| WO | WO-98/14863 A1 | 4/1998 |
| WO | WO-1998/014863 A2 | 4/1998 |
| WO | WO-99/038149 A1 | 7/1999 |
| WO | WO-01/27868 A1 | 4/2001 |
| WO | WO-01/39371 | 5/2001 |
| WO | WO-2002/035461 A1 | 5/2002 |
| WO | WO-02/061721 A2 | 8/2002 |
| WO | WO-02/103621 A2 | 12/2002 |
| WO | WO-03/079176 A2 | 9/2003 |
| WO | WO-2003/088176 A1 | 10/2003 |
| WO | WO-2004/013833 A2 | 2/2004 |
| WO | WO-2004/013833 A3 | 2/2004 |
| WO | WO-2004/023376 A2 | 3/2004 |
| WO | WO-2004/023376 A3 | 3/2004 |
| WO | WO-2004/053576 A1 | 6/2004 |
| WO | WO-2004/061808 A2 | 7/2004 |
| WO | WO-2004/061808 A3 | 7/2004 |
| WO | WO-2004/114265 A2 | 12/2004 |
| WO | WO-2005/064451 A1 | 7/2005 |
| WO | WO-2005/114369 A2 | 12/2005 |
| WO | WO-2005/114369 A3 | 12/2005 |
| WO | WO-2006/023569 A1 | 3/2006 |
| WO | WO-2006/054585 A1 | 5/2006 |
| WO | WO-2007/115032 A2 | 10/2007 |
| WO | WO-2007/115032 A3 | 10/2007 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2007/146785 A2 | 12/2007 |
| WO | WO-2007/146785 A3 | 12/2007 |
| WO | WO-2008/085457 A2 | 7/2008 |
| WO | WO-2008/085457 A3 | 7/2008 |
| WO | WO-2009/035471 A1 | 3/2009 |
| WO | WO-2010/137727 A1 | 2/2010 |
| WO | WO-2012/087639 A2 | 6/2012 |

OTHER PUBLICATIONS

Notice of Allowance dated Feb. 20, 2019, for U.S. Appl. No. 15/273,487, filed Sep. 22, 2016, nine pages.

"Gesture Recognition," (2006). Located at <http://www.fingerworks.com/gesture_recognition.html>, last visited Jul. 25, 2006, two pages.

3M (2002). MicroTouch Capacitive Touch Screens Datasheets, 3M Innovation, six pages.

Agrawal, R. et al. (Jul. 1986). "An Overview of Tactile Sensing," Center for Research on Integrated Manufacturing: Robot Systems Division, The University of Michigan, 47 pages.

Anonymous. (2013). "The Op-amp Integrator Amplifier," Electronics tutorial, retrieved from http://diodetech.blogspot.nl/2013/07/op-amp-integrator.html, on Feb. 11, 2016, eight pages.

Anonymous. (May 8, 1992). "The Sensor Frame Graphic Manipulator," *NASA Phase II Final Report*, 28 pages.

Anonymous. (Oct. 30, 2001). "Radiotelephone with Rotating Symbol Keypad and Multi-Directional Symbol Input,"located at www.vitgn.com/mobile_terminal.com, 12 pages.

Anonymous. "4-Wire Resistive Touchscreens" obtained from http://www.touchscreens.com/intro-touchtypes-4resistive.html generated Aug. 5, 2005.

Anonymous. "5-Wire Resistive Touchscreens" obtained from http://www.touchscreens.com/intro-touchtypes-resistive.html generated Aug. 5, 2005.

Anonymous. "A Brief Overview of Gesture Recognition" obtained from http://www. Dai. Ed. Ac.uk/Cvonline/LOCA_COPIES/COHEN/gesture_ overview.Html, generated Apr. 20, 2004.

Anonymous. "Capacitive Position Sensing" obtained from http://www.synaptics.com/technology/cps.cfin generated Aug. 5, 2005.

Anonymous. "Capacitive Touchscreens" obtained from http://www.touchscreens.com/intro-touchtypes-capacitive.html generated Aug. 5, 2005.

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004, 1—pg.

Anonymous. "FingerWorks—Gesture Guide—Editing," obtained from http://www.fingerworks.com/gesure_guide_editing.html, generated on Aug. 27, 2004, 1—pg.

Anonymous. "FingerWorks—Gesture Guide—File Operations," obtained from http://www.fingerworks.com/gesture_guide_files.html, generated on Aug. 27, 2004, 1—pg.

Anonymous. "FingerWorks—Gesture Guide—Text Manipulation," obtained from http://www.fingerworks.com/gesture_guide_text_manip.html, generated on Aug. 27, 2004, 2—pg.

Anonymous. "FingerWorks—Gesture Guide—Tips and Tricks," obtained from http://www.fingerworks.com/gesture_guide_tips.html, generated Aug. 27, 2004, 2—pgs.

Anonymous. "FingerWorks—Gesture Guide—Web," obtained from http://www.fingerworks.com/gesture_guide_web.html, generated on Aug. 27, 2004, 1—pg.

Anonymous. "FingerWorks—Guide to Hand Gestures for USB Touchpads," obtained from http://www.fingerworks.com/igesture_userguide.html, generated Aug. 27, 2004, 1-pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from http://www.fingerworks.com/resting.html, Copyright 2001, 1-pg.

Anonymous. "FingerWorks—Tips for Typing on the Mini," obtained from http://www.fingerworks.com/mini_typing.html, generated on Aug. 27, 2004, 2-pgs.

Anonymous. "GlidePoint®" obtained from http://www.cirque.com/technology/technology_gp.html generated Aug. 5, 2005.

Anonymous. "How do touchscreen monitors know where you're touching?" obtained from http://www.electronics.howstuffworks.com/question716.html generated Aug. 5, 2005.

(56) References Cited

OTHER PUBLICATIONS

Anonymous. "How does a touchscreen work?" obtained from http://www.touchscreens.com/intro-anatomy.html generated Aug. 5, 2005.
Anonymous. "iGesture Pad—the MultiFinger USB Touch Pad with Whole-Hand Gestures,"obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touch Technologies Overview" 2001, 3M Touch Systems, Massachusetts.
Anonymous. "Touchscreen Technology Choices," <http://www.elotouch.com/products/detech2.asp>, downloaded Aug. 5, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ii/plugins/watershed.html generated Aug. 5, 2005.
Bantz, et al. (Feb. 1979). "Keyboard Device for Upper and Lower Case Keying Without Shifting," IBM Technical Disclosure Bulletin, vol. 21, No. 9, two pages.
Baxter, L.K. (1996). *Capacitive Sensors: Design and Applications*, vol. 1 of IEEE Press Series on Electronics Technology, John Wiley & Sons: New York, NY, (Table of Contents Only) three pages.
Bennion, S.I. et al. (Dec. 1981). "Touch Sensitive Graphics Terminal Applied to Process Control," *Computer Graphics* 15(4):342-350.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Boie, R.A. (Mar. 1984). "Capacitive Impedance Readout Tactile Image Sensor," *Proceedings of 1984 IEEE International Conference on Robotics and Automation*, pp. 370-378.
Buxton, W.A.S. (Mar./Apr. 1994). "Combined Keyboard/Touch Tablet Input Device," *XEROX Disclosure Journal* 19(2):109-111.
Chinese Search Report dated Feb. 2, 2015, for CN Application No. 201210568727.0, filed Jun. 8, 2007, two pages.
Chinese Search Report dated Oct. 10, 2018, for CN Application No. 201610615835.7, filed Dec. 21, 2007, two pages.
Chun, K. et al. (Jul. 1985). "A High-Performance Silicon Tactile Imager Based on a Capacitive Cell," *IEEE Transactions on Electron Devices* 32(7):1196-1201.
Cliff (Jul. 24, 2002). "Building a Pressure-Sensitive, Multi-Point TouchScreen?" Posted from the D-I-Y-Baby Department, one page.

Collberg, C. et al. (2002). "TetraTetris: A Study of Multi-User Touch-Based Interaction Using DiamondTouch," located at cs.arizona.edu, eight pages. (located information via Google).
Dannenberg, R.B. et al. (1989). "A Gesture Based User Interface Prototyping System," *ACM*, pp. 127-132.
Davies, E.R. (1990). *Machine Vision: Theory, Algorithms, Practicalities*, Academic Press, Inc..: San Diego, CA, pp. xi-xxi (Table of Contents Only.).
Davies, E.R. (1997). "Boundary Pattern Analysis," Chapter 7 in *Machine Vision: Theory, Algorithms, Practicalities*, 2nd Edition, Academic Press, Inc.: San Diego, CA, pp. 171-191.
Davies, E.R. (1997). "Ellipse Detection," Chapter 11 in *Machine Vision: Theory, Algorithms, Practicalities*, 2nd Edition, Academic Press, Inc.: San Diego, CA, pp. 271-290.
Davies, E.R. (1997). "Image Acquisition," Chapter 23 in *Machine Vision: Theory, Algorithms, Practicalities*, 2nd Edition, Academic Press, Inc.: San Diego, CA, pp. 583-601.
Davies, E.R. (Aug. 1987). "Lateral Histograms for Efficient Object Location: Speed versus Ambiguity," *Pattern Recognition Letters* 6(3):189-198.
Diaz-Marino, R.A. et al. (2003). "Programming for Multiple Touches and Multiple Users: A Toolkit for the DiamondTouch Hardware," *Proceedings of ACM UIST'03 User Interface Software and Technology*, two pages.
Dietz, P. et al. (2001). "DiamondTouch: A Multi-User Touch Technology," *Proceedings of the 14th Annual ACM Symposium on User Interface Software and Technology*, Nov. 11-14, 2001, Orlando, FL, pp. 219-226.
Douglas et al., *The Ergonomics of Computer Pointing Devices* (1997).
Esenther, A. et al. (Nov. 2002). "DiamondTouch SDK: Support for Multi-User, Multi-Touch Applications," *Mitsubishi Electric Research Laboratories, Inc.*, five pages.
European Partial Search Report dated Mar. 13, 2017, for EP Application No. 11194616.6, filed Dec. 20, 2011, 6 pages.
European Search Report dated Nov. 7, 2017, for EP Application No. 17182184.6, eleven pages.
European Search Report dated Feb. 16, 2012, for EP Application No. 11183531.0, 11 pages.
European Search Report received in EP 1 621 989 (@ Beyer Weaver & Thomas, LLP) dated Mar. 27, 2006.
European Search Report dated Jul. 28, 2011, for EP Application No. 11159164.0, filed Jun. 8, 2007, eight pages.
European Search Report dated Oct. 21, 2011, for EP Application No. 11159166.5, filed Jun. 8, 2007, seven pages.
European Search Report dated Mar. 27, 2012, for EP Application No. 10178558.2, nine pages.
EVB Elektronik "TSOP6238 IR Receiver Modules for Infrared Remote Control Systems" dated Jan. 2004 1-pg.
*Ex Parte Quayle* Action mailed Apr. 20, 2016, for U.S. Appl. No. 11/818,395, filed Jun. 13, 2007, four pages.
Fearing, R.S. (Jun. 1990). "Tactile Sensing Mechanisms," *The International Journal of Robotics Research* 9(3):3-23.
Final Office Action dated Jul. 6, 2010, for U.S. Appl. No. 11/760,036, filed Jun. 8, 2007, 51 pages.
Final Office Action dated Jul. 6, 2010, for U.S. Appl. No. 11/760,080, filed Jun. 8, 2007, 66 pages.
Final Office Action dated Jul. 22, 2010, for U.S. Appl. No. 11/760,049, filed Jun. 8, 2007, 52 pages.
Final Office Action dated Aug. 2, 2010, for U.S. Appl. No. 11/760,060, filed Jun. 8, 2007, 78 pages.
Final Office Action dated Sep. 1, 2011, for U.S. Appl. No. 11/650,203, filed Jan. 3, 2007, nine pages.
Final Office Action dated Oct. 17, 2011, for U.S. Appl. No. 11/818,395, filed Jun. 13, 2007, 16 pages.
Final Office Action dated Dec. 16, 2011, for U.S. Appl. No. 11/760,036, filed Jun. 8, 2007, 53 pages.
Final Office Action dated Jan. 30, 2012, for U.S. Appl. No. 11/760,049, filed Jun. 8, 2007, 64 pages.
Final Office Action dated Feb. 27, 2012, for U.S. Appl. No. 11/760,080, filed Jun. 8, 2007, 62 pages.
Final Office Action dated May 9, 2013, for U.S. Appl. No. 12/976,997, filed Dec. 22, 2010, 7 pages.

(56) References Cited

OTHER PUBLICATIONS

Final Office Action dated Oct. 27, 2014, for U.S. Appl. No. 11/818,395, filed Jun. 13, 2007, 17 pages.
Final Office Action dated Feb. 8, 2016, for U.S. Appl. No. 14/670,306, filed Mar. 26, 2015, five pages.
Final Office Action dated Aug. 23, 2017, for U.S. Appl. No. 15/273,487, filed Sep. 22, 2016, 36 pages.
Final Office Action dated Aug. 8, 2018, for U.S. Appl. No. 15/593,182, filed May 11, 2017, 17 pages.
Fisher et al., "Repetitive Motion Disorders: The Design of Optimal Rate-Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World on Line.
Hector, J. et al. (May 2002). "Low Power Driving Options for an AMLCD Mobile Display Chipset," Chapter 16.3 *in SID 02 Digest* (2002 SID International Symposium, Digest of Technical Papers), XXXIII(II):694-697.
Hillier and Gerald J. Lieberman, *Introduction to Operations Research* (1986).
Hinckley, K. et al. (1998). "Interaction and Modeling Techniques for Desktop Two-Handed Input," *Proceedings of ACM USIT'98 Symposium on User Interface Software and Technology*, pp. 49-58.
Hinckley, K. et al. (2000). "Sensing Techniques for Mobile Interaction," *CHI Letters* 2(2):91-100.
Hinckley, K. et al. (May 1999). "Touch-Sensing Input Devices," *CHI 99* pp. 223-230.
Hlady, A.M. (1969). "A Touch Sensitive X-Y Position Encoder for Computer Input," *Fall Joint Computer Conference*, pp. 545-551.
Hotelling et al., Office action for U.S. Appl. No. 10/840,862 dated May 14, 2008.
International Search Report dated Mar. 3, 2006 (PCT/US 05/03325; 119-0052WO).
International search report for International Application No. PCT/US2005/014364 dated Jan. 12, 2005.
International Search Report dated Jul. 18, 2008, for PCT Application No. PCT/2007/70725, filed Jun. 8, 2007, six pages.
International Search Report dated Jul. 18, 2008, for PCT Application No. PCT/2007/70729, filed Jun. 8, 2007, five pages.
International Search Report dated Jun. 15, 2012, for PCT/US2011/064455, filed Dec. 12, 2011, four pages.
International Search Report dated Jun. 24, 2008, for PCT Application No. PCT/US2007/026298, filed Dec. 21, 2007, two pages.
International Search Report dated Mar. 6, 2008, for PCT Application No. PCT/2007/70733, filed Jun. 8, 2007, five pages.
International Search Report dated Mar. 7, 2008, for PCT Application No. PCT/2007/70722, filed Jun. 8, 2007, three pages.
International Search Report dated Oct. 16, 2008, for PCT Application No. PCT/US2007/088749, filed Dec. 21, 2007, four pages.
International Search Report received in corresponding PCT application No. PCT/US2006/008349 dated Oct. 6, 2006.
Jacob et al., "Integrality and Separability of Input Devices," *ACM Transactions on Computer-Human Interaction*, 1:3-26 (Mar. 1994).
Kanda, E. et al. (2008). "55.2: Integrated Active Matrix Capacitive Sensors for Touch Panel LTPS-TFT LCDs," *SID 08 Digest*, pp. 834-837.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Kirk, D.E. (1970). "Numerical Determination of Optimal Trajectories," Chapter 6 in *Optimal Control Theory: An Introduction*, Prentice Hall, Inc.: Englewood Cliffs, NY. pp. 329-413, with Table of Contents, pp. vii-ix. (90 pages total).
Kling, M. et al. (Sep. 2003). "Interface Design: LCD Touch Interface for ETRAX 100LX," Thesis Submitted in Partial Fulfillment of the Requirements for the Degree of Master of Science, Umea University, UMEA, Sweden, 79 pages.

Ko, H. (Jul. 2000). "Open Systems Advanced Workstation Transition Report," Technical Report 1822, *U.S. Navy*, SSC San Diego, CA, 82 pages.
Krein, P. et al. (May/Jun. 1990). "The Electroquasistatics of the Capacitive Touch Panel," *IEEE Transactions on Industry Applications* 26(3):529-534.
Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.
Lee, "A Fast Multiple-Touch-Sensitive Input Device," Master's Thesis, University of Toronto. (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Leeper (Synaptics Inc.) "Integration of a clear capacitive touch screen with a 1/8-VGA FSTN-LCD to form and LCD based touchpad," Society for information Display (May 21, 2002).
Leigh, J. et al. (2002). "Amplified Collaboration Environments," *VizGrid Symposium*, Nov. 2002, Tokyo, Japan, nine pages.
Ljungstrand, P. et al. eds. (2002). UBICOMP2002, Adjunct Proceedings, *4th International Conference on Ubiquitous Computing*, Sep. 29-Oct. 1, 2002, Goteborg, Sweden, 90 pages.
Magerkurth, C. et al. (2004). "Towards the Next Generation of Tabletop Gaming Experiences," *Graphics Interface 2004 (GI'04)*, May 17-19, 2004, Ontario, Canada, pp. 1-8.
Malik, S. et al. (2004). "Visual Touchpad: A Two-Handed Gestural Input Device," *ICMI'04 Proceedings of the 6th International Conference on Multimodal Intercases*, ACM, 8 pages.
Matsushita et al., "HoloWall: Designing a Finger, Hand, Body and Object Sensitive Wall," In Proceedings of UIST '97, Oct. 1997.
Matsushita, N. et al. (2000). "Dual Touch: A Two-Handed Interface for Pen-Based PDAs," *CHI Letters* 2(2):211-212.
McMillan, G.R. (Oct. 1998). "The Technology and Applications of Gesture-Based Control," *presented at the RTO Lecture Series on Alternative Control Technologies: Human Factor Issues*, Oct. 14-15, 1998, Ohio, USA, pp. 4-1-4-11.
Mehta, N. et al. (May 1982). "Feature Extraction as a Tool for Computer Input," *Proceedings of ICASSP '82*, May 3-5, 1982, Paris, France, pp. 818-820.
Mitchell, G. D. (Oct. 2003). "Orientation on Tabletop Displays," Thesis Submitted in Partial Fulfillment of the Requirements for the Degree of Master of Science, Simon Fraser University, 119 pages.
Netherlands Search Report dated Jul. 2, 2013, for Dutch Patent Application No. 2008003, ten pages.
Noda, K. et al. (2001). "Production of Transparent Conductive Films with Inserted $SiO_2$ Anchor Layer, and Application to a Resistive Touch Panel," *Electronics and Communications in Japan* Part 2 84(7):39-45.
Non-Final Office Action for *Ex Parte* Reexamination mailed Dec. 24, 2013, of U.S. Pat. No. 7,663,607, 52 pages.
Non-Final Office Action dated May 14, 2008, for U.S. Appl. No. 10/840,862, filed May 6, 2004, six pages.
Non-Final Office Action dated Dec. 24, 2008, for U.S. Appl. No. 10/840,862, filed May 6, 2004, nine pages.
Non-Final Office Action dated Jun. 2, 2009, for U.S. Appl. No. 10/840,862, filed May 6, 2004, seven pages.
Non-Final Office Action dated Nov. 12, 2009, for U.S. Appl. No. 10/840,862, filed May 6, 2004, eight pages.
Non-Final Office Action dated Mar. 12, 2010, for U.S. Appl. No. 11/760,080, filed Jun. 8, 2007, 31 pages.
Non-Final Office Action dated Apr. 22, 2010, for U.S. Appl. No. 11/760,036, filed Jun. 8, 2007, 37 pages.
Non-Final Office Action dated Apr. 23, 2010, for U.S. Appl. No. 11/760,060, filed Jun. 8, 2007, 66 pages.
Non-Final Office Action dated May 5, 2010, for U.S. Appl. No. 11/760,049, filed Jun. 8, 2007, 65 pages.
Non-Final Office Action dated Jun. 21, 2010, for U.S. Appl. No. 11/650,203, filed Jan. 3, 2007, eight pages.
Non-Final Office Action dated Jan. 25, 2011, for U.S. Appl. No. 11/818,395, filed Jun. 13, 2007, 31 pages.
Non-Final Office Action dated Mar. 14, 2011, for U.S. Appl. No. 11/650,203, filed Jan. 3, 2007, nine pages.

(56) References Cited

OTHER PUBLICATIONS

Non-Final Office Action dated May 13, 2011, for U.S. Appl. No. 12/267,540, filed Nov. 7, 2008, seven pages.
Non-Final Office Action dated Jul. 8, 2011, for U.S. Appl. No. 12/267,532, filed Nov. 7, 2008, five pages.
Non-Final Office Action dated Jul. 14, 2011, for U.S. Appl. No. 12/267,522, filed Nov. 7, 2008, six pages.
Non-Final Office Action dated Aug. 4, 2011, for U.S. Appl. No. 11/760,036, filed Jun. 8, 2007, 45 pages.
Non-Final Office Action dated Aug. 11, 2011, for U.S. Appl. No. 11/760,049, filed Jun. 8, 2007, 60 pages.
Non-Final Office Action dated Sep. 1, 2011, for U.S. Appl. No. 11/760,060, filed Jun. 8, 2007, 76 pages.
Non-Final Office Action dated Nov. 14, 2011, for U.S. Appl. No. 11/760,080, filed Jun. 8, 2007, 60 pages.
Non-Final Office Action dated Feb. 17, 2012, for U.S. Appl. No. 13/251,099, filed Sep. 30, 2011, seven pages.
Non-Final Office Action dated Jun. 20, 2012, for U.S. Appl. No. 13/345,347, filed Jan. 6, 2012, five pages.
Non-Final Office Action dated Sep. 12, 2012, for U.S. Appl. No. 11/650,203, filed Jan. 3, 2007, nine pages.
Non-Final Office Action dated Oct. 5, 2012, for U.S. Appl. No. 12/976,997, filed Dec. 22, 2010, 6 pages.
Non-Final Office Action dated Oct. 11, 2012, for U.S. Appl. No. 13/538,498, filed Jun. 29, 2012, 17 pages.
Non-Final Office Action dated Mar. 29, 2013, for U.S. Appl. No. 13/717,573, filed Dec. 17, 2012, five pages.
Non-Final Office Action dated May 30, 2013, for U.S. Appl. No. 13/251,099, filed Sep. 30, 2011, seven pages.
Non-Final Office Action dated Jun. 27, 2013, for U.S. Appl. No. 11/760,080, filed Jun. 8, 2007, 48 pages.
Non-Final Office Action dated Dec. 24, 2013, for *Ex Parte* Reexamination of U.S. Pat. No. 7,663,607, 52 pages.
Non-Final Office Action dated Dec. 30, 2013, for U.S. Appl. No. 12/976,997, filed Dec. 22, 2010, six pages.
Non-Final Office Action dated Mar. 25, 2014, for U.S. Appl. No. 14/073,818, filed Nov. 6, 2013, six pages.
Non-Final Office Action dated Apr. 18, 2014, for U.S. Appl. No. 11/818,395, filed Jun. 13, 2007, 17 pages.
Non-Final Office Action dated Jul. 14, 2014, for U.S. Appl. No. 14/308,595, filed Jun. 18, 2014, five pages.
Non-Final Office Action dated Aug. 4, 2014, for U.S. Appl. No. 14/086,877, filed Nov. 21, 2013, 8 pages.
Non-Final Office Action dated Sep. 26, 2014, for U.S. Appl. No. 14/308,646, filed Jun. 18, 2013, five pages.
Non-Final Office Action dated Jan. 30, 2015, for U.S. Appl. No. 14/047,960, filed Oct. 7, 2013, 18 pages.
Non-Final Office Action dated May 7, 2015, for U.S. Appl. No. 14/174,760, filed Feb. 6, 2014, 27 pages.
Non-Final Office Action dated May 12, 2015, for U.S. Appl. No. 14/670,306, filed Mar. 26, 2015, five pages.
Non-Final Office Action dated Sep. 10, 2015, for U.S. Appl. No. 11/818,395, filed Jun. 13, 2007, 17 pages.
Non-Final Office Action dated Oct. 8, 2015, for U.S. Appl. No. 14/670,306, filed Mar. 26, 2015, four pages.
Non-Final Office Action dated Mar. 31, 2017, for U.S. Appl. No. 15/273,487, filed Sep. 22, 2016, 24 pages.
Non-Final Office Action dated Nov. 7, 2017, for U.S. Appl. No. 15/593,182, filed May 11, 2017, 15 pages.
Non-Final Office Action dated Feb. 23, 2018, for U.S. Appl. No. 15/424,712, filed Feb. 3, 2017, 25 pages.
Non-Final Office Action dated Jul. 26, 2018, for U.S. Appl. No. 15/273,487, filed Sep. 22, 2016, 23 pages.
Non-Final Office Action for *Ex Parte* Reexamination mailed May 16, 2014, of U.S. Pat. No. 7,663,607, 34 pages.
Notice of Allowance dated Oct. 25, 2011, for U.S. Appl. No. 12/267,540, filed Nov. 7, 2008, seven pages.
Notice of Allowance dated Mar. 27, 2012, for U.S. Appl. No. 11/760,060, filed Jun. 8, 2007, 17 pages.
Notice of Allowance dated Apr. 27, 2012, for U.S. Appl. No. 11/760,036, filed Jun. 8, 2007, eight pages.
Notice of Allowance dated Jul. 12, 2012, for U.S. Appl. No. 13/251,099, filed Sep. 30, 2011, seven pages.
Notice of Allowance dated Sep. 19, 2012, for U.S. Appl. No. 13/345,347, filed Jan. 6, 2012, seven pages.
Notice of Allowance dated Oct. 29, 2012, for U.S. Appl. No. 13/345,347, filed Jan. 6, 2012, eight pages.
Notice of Allowance dated Feb. 6, 2013, for U.S. Appl. No. 13/084,402, filed Apr. 11, 2011, 12 pages.
Notice of Allowance dated Feb. 19, 2013, for U.S. Appl. No. 13/538,498, filed Jun. 29, 2012, 16 pages.
Notice of Allowance dated Apr. 26, 2013, for U.S. Appl. No. 11/650,203, filed Jan. 3, 2007, eight pages.
Notice of Allowance dated May 28, 2013, for U.S. Appl. No. 11/760,049, filed Jun. 8, 2007, 10 pages.
Notice of Allowance dated Jul. 19, 2013, for U.S. Appl. No. 13/717,573, filed Dec. 17, 2012, eight pages.
Notice of Allowance dated Oct. 10, 2013, for U.S. Appl. No. 11/760,080, filed Jun. 8, 2007, ten pages.
Notice of Allowance dated Mar. 3, 2014, for U.S. Appl. No. 13/251,099, filed Sep. 30, 2011, eight pages.
Notice of Allowance dated Apr. 14, 2014, for U.S. Appl. No. 12/976,997, filed Dec. 22, 2010, 8 pages.
Notice of Allowability (Corrected) dated Jun. 27, 2014, for U.S. Appl. No. 12/976,997, filed Dec. 22, 2010, five pages.
Notice of Allowance dated Jul. 14, 2014, for U.S. Appl. No. 14/073,818, filed Nov. 6, 2013, seven pages.
Notice of Allowance dated Oct. 31, 2014, for U.S. Appl. No. 14/308,595, filed Jun. 18, 2014, eight pages.
Notice of Allowance dated Nov. 6, 2014, for U.S. Appl. No. 14/308,646, filed Jun. 18, 2014, eight pages.
Notice of Allowance dated Dec. 23, 2014, for U.S. Appl. No. 14/456,831, filed Aug. 11, 2014, eight pages.
Notice of Allowance dated Jan. 14, 2015, for U.S. Appl. No. 14/086,877, filed Nov. 21, 2013, eight pages.
Notice of Allowability (Corrected) dated Jan. 21, 2015, for U.S. Appl. No. 14/308,646, filed Jun. 18, 2014, five pages.
Notice of Allowance dated May 28, 2015, for U.S. Appl. No. 14/666,174, filed Mar. 23, 2015, eight pages.
Notice of Allowance dated Jun. 29, 2015, for U.S. Appl. No. 14/047,960, filed Oct. 7, 2013, 11 pages.
Notice of Allowance (corrected) dated Jul. 2, 2015, for U.S. Appl. No. 14/666,174, filed Mar. 23, 2015, five pages.
Notice of Allowance dated Sep. 14, 2015, for U.S. Appl. No. 14/174,760, filed Feb. 6, 2014, 12 pages.
Notice of Allowance dated Oct. 19, 2015, for U.S. Appl. No. 14/047,960, filed Oct. 7, 2013, eight pages.
Notice of Allowance dated May 25, 2016, for U.S. Appl. No. 14/670,306, filed Mar. 26, 2015, eight pages.
Notice of Allowance dated Sep. 28, 2016, for U.S. Appl. No. 14/985,283, filed Dec. 30, 2015, ten pages.
Notice of Allowance dated Nov. 17, 2016, for U.S. Appl. No. 15/273,487, filed Sep. 22, 2016, eight pages.
Notice of Allowance dated Mar. 13, 2017, for U.S. Appl. No. 11/818,395, filed Jun. 13, 2007, 13 pages.
Notice of Allowance dated May 3, 2017, for U.S. Appl. No. 14/838,234, filed Aug. 27, 2015, ten pages.
Notice of Allowance dated Mar. 21, 2018, for U.S. Appl. No. 15/273,487, filed Sep. 22, 2016, eight pages.
Notice of Allowance dated Sep. 14, 2018, for U.S. Appl. No. 15/424,712, filed Feb. 3, 2017, ten pages.
Notice of Allowance (corrected) dated Sep. 27, 2018, for U.S. Appl. No. 15/424,712, filed Feb. 3, 2017, seven pages.
Notice of Prior and Concurrent Proceeedings under 37 C.F.R. § 1.565(a) for U.S. *Ex Parte* Reexamination U.S. Appl. No. 90/012,935, filed Jul. 30, 2013 (Reexamination of U.S. Pat. No. 7,663,607), 279 pages. (Submitted in four parts).
Ogawa, H. et al. (1979). "Preprocessing for Chinese Character Recognition and Global Classification of Handwritten Chinese Characters," *Pattern Recognition* 11:1-7.
Partial European Search Report dated Mar. 15, 2011, for EP Application No. 10178661.4, filed Jun. 8, 2007, six pages.

(56) References Cited

OTHER PUBLICATIONS

Partial European Search Report dated Oct. 21, 2011, for EP Application No. 11159165.7 filed Jun. 8, 2007, seven pages.
Partial European Search Report dated Oct. 24, 2011, for EP Application No. 11159167.3 filed Jun. 8, 2007, eight pages.
Phipps, C.A. (Spring 2003). "A Metric to Measure Whole Keyboard Index of Difficulty Based on Fitts' Law," A Dissertation Submitted in Partial Fulfillment of the Requirements for the Degree of Ph.D., 103 pages.
Quantum Research Group "QT510 / Qwheel™ Touch Slider IC" copyright 2004-2005, 14-pgs.
Quantum Research Group Ltd. (1997). QT9701B2 Datasheet, 30 pages.
Quantum Research Group Ltd. (1999). QProx™ QT60320 32-Key Qmatrix™ Charge-Transfer IC Datasheet, pp. 1-14.
Quantum Research Group Ltd. (2001). QT60325, QT60485, QT60645 32, 48, 64 Key QMatrix™ Keypanel Sensor Ics Datasheet, 42 pages.
Quantum Research Group Ltd. (2002). QMatrix™ QT60040 4-Key Charge-Transfer IC Datasheet, pp. 1-9.
Quantum Research Group Ltd. (Oct. 10, 2002). Quantum Research Application Note AN-KD01: Qmatrix™ Panel Design Guidelines, four pages.
Quek, "Unencumbered Gestural Interaction," *IEEE Multimedia*, 3:36-47 (Winter 1996).
Rabuffetti, M. (2002). "Touch-screen System for Assessing Visuomotor Exploratory Skills in Neuropsychological Disorders of Spatial Cognition," *Medical & Biological Engineering & Computing* 40:675-686.
Radwin, "Activation Force and Travel Effects on Overexertion in Repetitive Key Tapping," *Human Factors*, 39(1):130-140 (Mar. 1997).
Raisamo, R. (Dec. 7, 1999). "Multimodal Human-Computer Interaction: A Constructive and Empirical Study," Dissertation, University of Tampere, Finland, 86 pages.
Rekimoto et al., "ToolStone: Effective Use of the Physical Manipulation Vocabularies of Input Devices," In Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rekimoto, J. et al. (2003). "Pre-Sense: Interaction Techniques for Finger Sensing Input Devices," *CHI Letters* 5(2):203-212.
Request for *Ex Parte* Reexamination of U.S. Pat. No. 7,663,607, 106 pages.
Response to Non-Final Office Action in *Ex Parte* Reexamination dated Mar. 24, 2014, of U.S. Pat. No. 7,663,607, 392 pages. (Submitted in two parts).
Rong, J. et al. (2002). "AIAA 2002-4553: Hierarchical Agent Based System for General Aviation CD&R Under Free Flight," *AIAA Guidance, Navigation, and Control Conference and Exhibit*, Aug. 5-8, 2002, Monterey, CA, pp. 1-11.
Rubine et al., "Programmable Finger-Tracking Instrument Controllers," *Computer Music Journal*, vol. 14, No. 1 (Spring 1990).
Rubine, D. (Jul. 1991). "Specifying Gestures by Example," *Computer Graphics* 25(4):329-337.
Rubine, D. et al. (1988). "The VideoHarp," *Proceedings of the 14th International Computer Music Conference*, Cologne, W. Germany, Sep. 20-25, 1988, pp. 49-55.
Rubine, D. et al. (1991). "The Videoharp: An Optical Scanning MIDI Controller," *Contemporary Music Review* 6(1):31-46.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Russell, D.M. et al. (2004). "The Use Patterns of Large, Interactive Display Surfaces: Case Studies of Media Design and use for BlueBoard and MERBoard," *Proceedings of the 37th Hawaii International Conference on System Sciences 2004, IEEE*, pp. 1-10.

Rutledge et al., "Force-To-Motion Functions for Pointing," Human-Computer Interaction—INTERACT (1990).
Sears, A. (Mar. 11, 1991). "Improving Touchscreen Keyboards: Design Issues and a Comparison with Other Devices," *Human-Computer Interaction Laboratory*, pp. 1-19.
Sears, A. et al. (Jun. 1990). "A New Era for High-Precision Touchscreens," *Advances in Human-Computer Interaction*, vol. 3, Tech Report HCIL-90-01, one page only.
Segen, J. et al. (1998). "Human-Computer Interaction Using Gesture Recognition and 3D Hand Tracking," *IEEE*, pp. 188-192.
Shen, C. et al. (Jan. 2004). "DiamondSpin: An Extensible Toolkit for Around-the-Table Interaction," *CHI 2004*, Apr. 24-29, 2004, Vienna, Austria, 10 pgs.
Siegel, D.M. et al. (1987). "Performance Analysis of a Tactile Sensor," *IEEE*, pp. 1493-1499.
Singapore Examination Report dated Jan. 11, 2010, for SG Patent Application No. 0607116-1, five pages.
Son, J.S. et al. (1996). "Comparison of Contact Sensor Localization Abilities During Manipulation," *Robotics and Autonomous System* 17 pp. 217-233.
Stansfield, S.A. (Mar. 1990). "Haptic Perception With an Articulated, Sensate Robot Hand," *SANDIA Report*: SAND90-0085-UC-406, 37 pages.
Stauffer, R.N. ed. (Jun. 1983). "Progress in Tactile Sensor Development," *Robotics Today* pp. 43-49.
Stumpe, B. (Feb. 6, 1978). "Experiments to Find a Manufacturing Process for an X-Y Touch Screen: Report on a Visit to Polymer-Physik GmbH," *CERN*, five pages.
Stumpe, B. (Mar. 16, 1977). "A New Principle for an X-Y Touch Screen," *CERN*, 19 pages.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sugiyama, S. et al. (Mar. 1990). "Tactile Image Detection Using a 1k-element Silicon Pressure Sensor Array," *Sensors and Actuators* A21-A23(1-3):397-400.
Suzuki, K. et al. (Aug. 1990). "A 1024-Element High-Performance Silicon Tactile Imager," *IEEE Transactions on Electron Devices* 37(8):1852-1860.
Texas Instruments "TSC2003 / I2C Touch Screen Controller" Data Sheet SBAS 162, dated Oct. 2001, 20-pgs.
TW Search Report dated Dec. 17, 2015, for TW Patent Application No. 103130159, one page.
TW Search Report dated Feb. 11, 2014, for TW Patent Application No. 100145112, with English translation, two pages.
TW Search Report dated Jun. 27, 2011, for TW Patent Application No. 097100481, one page.
U.S. Appl. No. 11/015,978, filed Dec. 17, 2004.
U.S. Appl. No. 60/072,509, filed Jan. 26, 1998, by Westerman et al. (copy not attached).
U.S. Appl. No. 60/333,770, filed Nov. 29, 2001, by Perski et al. (copy not attached).
U.S. Appl. No. 60/406,662, filed Aug. 29, 2002, by Morag et al. (copy not attached.) (90.00 ReExam).
U.S. Appl. No. 60/501,484, filed Sep. 5, 2003, by Perski et al. (copy not attached).
Van Kleek, M. (Feb. 2003). "Intelligent Environments for Informal Public Spaces: The Ki/o Kiosk Platform," Thesis Submitted in Partial Fulfillment of the Requirements for the Degree of Master of Engineering, MIT, 108 pages.
Van Oversteegen, B.G.F.A.W. (Apr. 10, 1998). "Touch Screen Based Measuring Equipment: Design and Implementation," Master's Thesis, Submitted to Technische Universiteit, Eindhoven, The Nederlands, 103 pages.
Vazquez, A.A. (Sep. 1990). "Touch Screen Use on Flight Simulator Instructor/Operator Stations," Thesis Submitted in Partial Fulfillment of the Requirements for the Degree of Master of Science in Information Systems, 78 pages.
Vernier, F. et al. (2002). "Multi-User, Multi-Finger Drag & Drop of Multiple Documents," located at http://www.edgelab.ca/CSCW/Workshop2002/fred_vernier, three pages.
Wacom Company Limited. (Nov. 12, 2003). Wacom intuos® 2 User's Manual for Windows®, English V4.1, 165 pages.

(56) References Cited

OTHER PUBLICATIONS

Wallergard, M. (2003). "Designing Virtual Environments for Brain Injury Rehabilitation," Thesis, Lund University, Sweden, 98 pages.
Wellner, "The Digital Desk Calculators: Tangible Manipulation on a Desk Top Display" In ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Westerman, W. et al. (2001). "Multi-Touch: A New Tactile 2-D Gesture Interface for Human-Computer Interaction," *Proceedings of the Human Factors and Ergonomics Societ $45^{th}$ Annual Meeting*, pp. 632-636.
Williams, "Applications for a Switched-Capacitor Instrumentation Building Block" Linear Technology Application Note 3, Jul. 1985, pp. 1-16.
Wu, M. et al. (2003). "Multi-Finger and Whole Hand Gestural Interaction Techniques for Multi-User Tabletop Displays," *ACM* pp. 193-202.
Yamada et al., "A Switched-Capacitor Interface for Capacitive Pressure Sensors" IEEE Transactions on Instrumentation and Measurement, vol. 41, No. 1, Feb. 1992, pp. 81-86.
Yee, K-P. (2004). "Two-Handed Interaction on a Tablet Display,"CHI'04, pp. 1493-1496.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.

\* cited by examiner

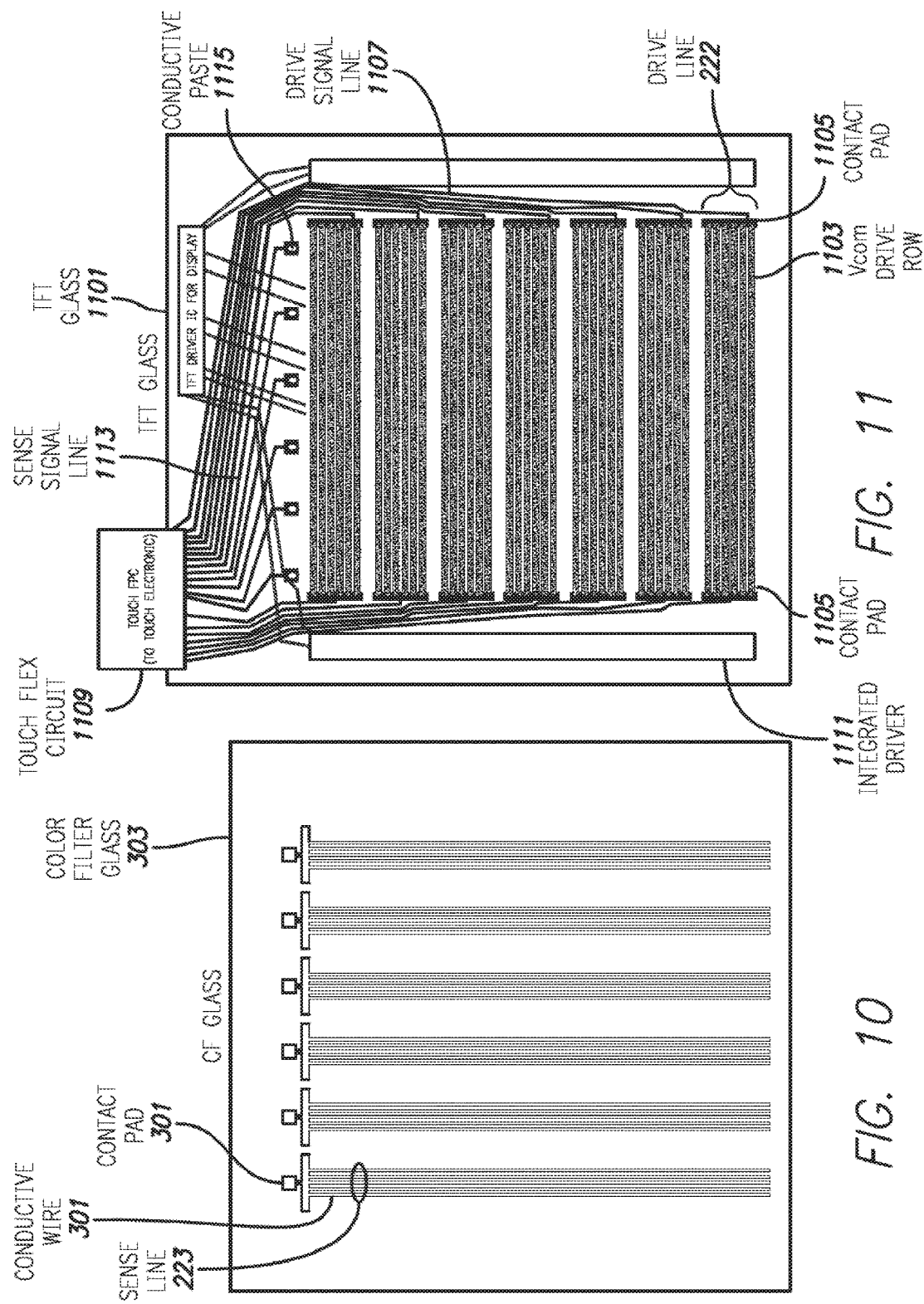

INTEGRATED TOUCH SCREENS

CROSS-REFERENCE TO RELATED APPLICATIONS

This application is a continuation of U.S. application Ser. No. 15/593,182, filed on May 11, 2017 and published on Sep. 21, 2017 as U.S. Publication No. 2017/0269738, which is a continuation of U.S. application Ser. No. 14/838,234, filed Aug. 27, 2015 and issued on Aug. 8, 2017 as U.S. Pat. No. 9,727,193, which is a continuation of U.S. application Ser. No. 14/666,174, filed Mar. 23, 2015 and issued on Sep. 29, 2015 as U.S. Pat. No. 9,146,414, which is a continuation of U.S. application Ser. No. 14/456,831, filed Aug. 11, 2014 and issued on May 5, 2015 as U.S. Pat. No. 9,025,090, which is a divisional of application Ser. No. 12/976,997, filed Dec. 22, 2010 and issued on Aug. 12, 2014 as U.S. Pat. No. 8,804,056, the contents of which are incorporated by reference herein in their entirety for all purposes.

FIELD OF THE DISCLOSURE

This relates generally to integrated touch screens, and more particularly, to integrated touch screens including drive lines formed of grouped-together circuit elements of a thin film transistor layer and sense lines formed between a color filter layer and a material layer that modifies or generates light.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of integrated touch screens including drive lines formed of grouped-together circuit elements of a thin film transistor layer and sense lines formed between a color filter layer and a material layer that modifies or generates light. In some examples, the touch screen can be an in-plane switching (IPS) liquid crystal display (LCD), fringe field switching (FFS), advanced fringe field switching (AFFS), etc. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

BRIEF DESCRIPTION OF THE DRAWINGS

FIG. 10 includes an example configuration of a color filter glass including contact pads connected to sense lines according to embodiments of the disclosure.

FIG. 11 illustrates an example configuration of a TFT glass according to embodiments of the disclosure.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of integrated touch screens including drive lines formed of grouped-together circuit elements of a thin film transistor layer and sense lines formed between a color filter layer and a material layer that modifies or generates light. In some examples, the touch screen can be an in-plane switching (IPS) liquid crystal display (LCD), fringe field switching (FFS), advanced fringe field switching (AFFS), etc. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

During a display operation, in which an image is displayed on the touch screen, the Vcom can serve as part of the display circuitry, for example, by carrying a common voltage to create, in conjunction with a pixel voltage on a pixel electrode, an electric field across the liquid crystal. During a touch sensing operation, the a stimulation signal can be applied to a group of Vcom that form a drive line. A sense signal based on the stimulation signal can be received by the sense lines on the underside of the color filter glass and processed by a touch processor to determine an amount and location of touch on the touch screen.

Figure 1:
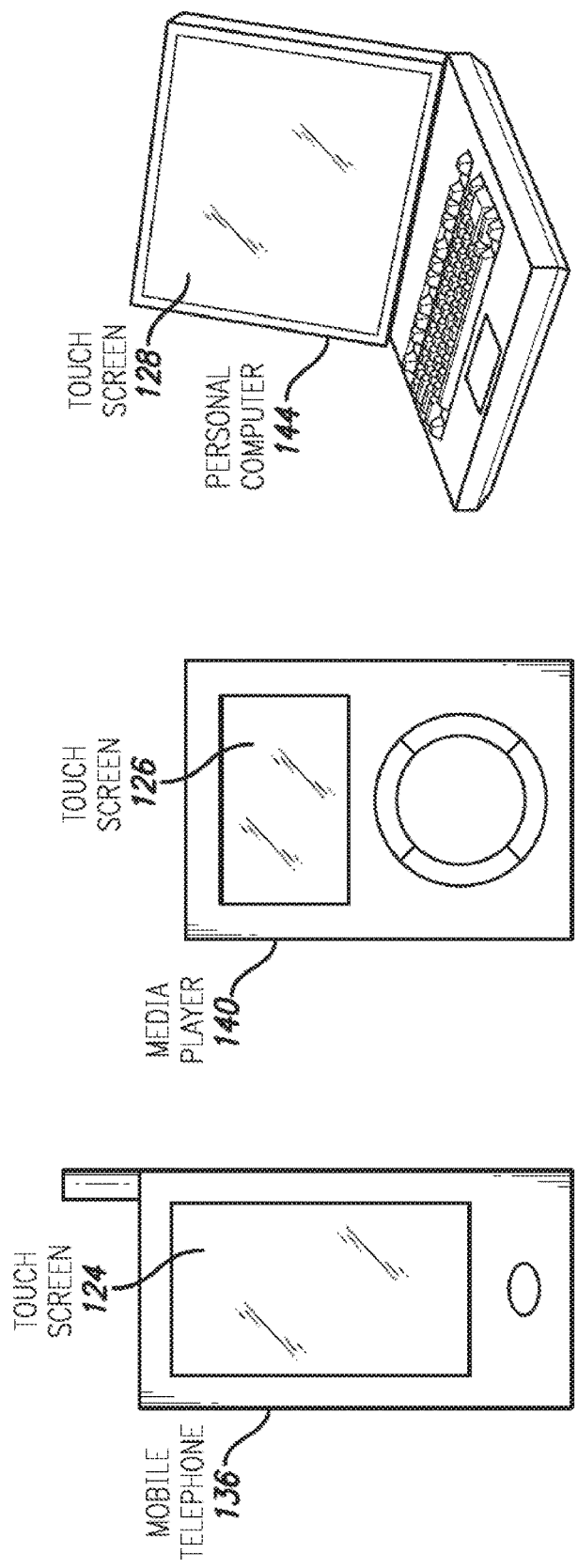
FIGS. 1A-1C illustrate an example mobile telephone, an example media player, and an example personal computer that each include an example touch screen according to embodiments of the disclosure.

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, capacitive touch, etc.

Figure 2:
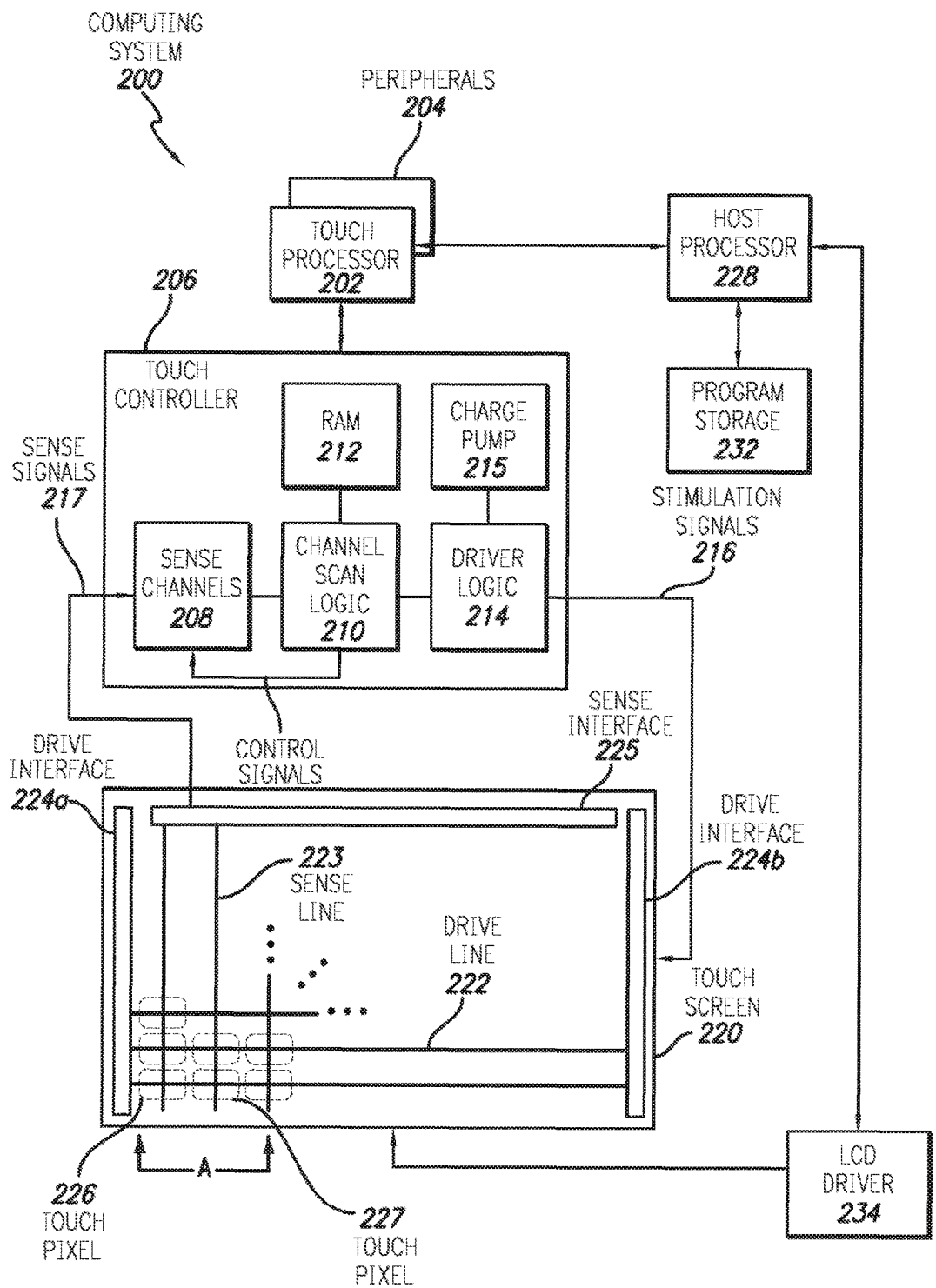
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive lines of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc, and multiple electrically conductive circuit elements that can be electrically connected to form a single electrically conductive pathway. Drive lines 222 can be driven by stimulation signals 216 from driver logic 214 through drive interfaces 224a and 224b, and resulting sense signals 217 generated in sense lines 223 can be transmitted through a sense interface 225 to sense channels 208 (also referred to as an event detection and demodulation circuit) in touch controller 206. The stimulation signal may be an alternating current (AC) waveform. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined an amount of touch detected at each touch pixel in the touch screen, the pattern of touch pixels in the touch screen at which a touch occurred can be thought of as an "image" of touch (e.g. a pattern of fingers touching the touch screen).

Structures and operations of various example embodiments of integrated touch screens will now be described with reference to FIGS. 3-15.

Figure 3:
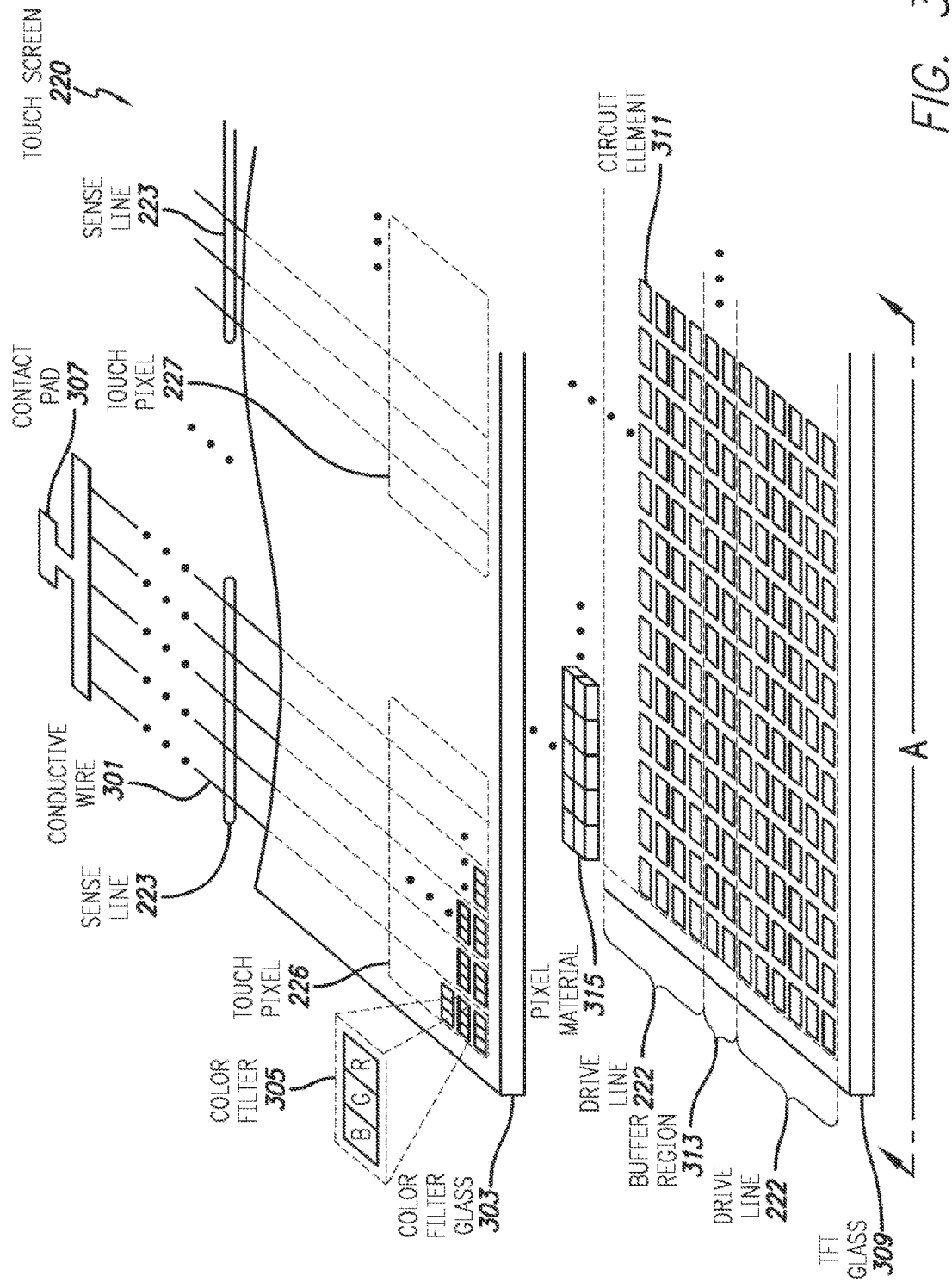
FIG. 3 illustrates example configurations of sense lines, drive lines, and other example structures of a touch screen according to embodiments of the disclosure.

FIG. 3 illustrates example embodiments of sense lines, drive lines, and other example structures of touch screen. FIG. 3 shows a more detailed view of a lower left hand portion of touch screen 220 along line "A" shown in FIG. 2. In the example embodiment shown in FIG. 3, each sense line 223 includes multiple conductive wires 301, e.g., five conductive wires in this example embodiment. Conductive wires 301 are disposed on the underside of a color filter glass 303, between the color filter glass and the TFT glass. The color filter glass 303 can include a plurality of color filters 305. In this example embodiment, color filters 305 each include three colors, blue (B), green (G), and red (R), such as in an RGB display. Each conductive wire 301 is positioned between two columns of color filters 305. In this example, the space between the columns of the color filters can be widened to accommodate the conductive wire. In the example shown, five conductive wires 301 of each sense line 223 can be connected to a contact pad 307 that conductively connects the conductive wires of the sense line and allows each group of five conductive wires to operate as a single sense line. Contact pads 307 can be electrically connected to, for example, sense channels 208 of touch controller 206 shown in FIG. 2, so that sense signals 217 received by each sense line 223 can be processed by the touch controller.

FIG. 3 also shows a TFT glass 309, on which can be formed circuit elements 311. Circuit elements 311 can be, for example, multi-function circuit elements that operate as part of the display circuitry of the touch screen and also as part of the touch sensing circuitry of the touch screen. In some embodiments, circuit elements 311 can be single-function circuit elements that operate only as part of the touch sensing system. In addition to circuit elements 311, other circuit elements (not shown) can be formed on TFT glass 309, such as transistors, capacitors, conductive vias, data lines, gate lines, etc. Circuit elements 311 and the other circuit elements formed on TFT glass 309 can operate together to perform various display functionality required for the type of display technology used by touch screen 220, as one skilled in the art would understand. The circuit elements can include, for example, elements that can exist in conventional LCD displays. It is noted that circuit elements are not limited to whole circuit components, such a whole capacitor, a whole transistor, etc., but can include portions of circuitry, such as only one of the two plates of a parallel plate capacitor.

Some of the circuit elements 311 can be electrically connected together such that the circuit elements 311 and their interconnections together form drive lines 222. Various example methods of connecting together circuit elements 311 to form drive lines 222 will be discussed in more detail in reference to FIGS. 8-9. Some of the circuit elements 311 that lie between drive lines 222 can serve as a buffer region 313. One purpose of the buffer region 313 can be to separate drive lines 222 from one another to reduce or to prevent cross talk and stray capacitance effects. Circuit elements 311 in buffer region 313 can, for example, be unconnected from drive lines 222. In various embodiments, some or all of the circuit elements 311 in buffer region 313 can be, for example, electrically connected to each other, electrically unconnected from each other, maintained at a fixed voltage during a touch sensing operation, maintained at a floating potential during a touch sensing operation, etc. The example configurations of sense lines 223 and drive lines 222 shown in FIG. 3 can be laid out as shown in FIG. 2 as an overlapping orthogonal grid to form touch pixels 226 and 227, for example. Although not illustrated in FIG. 3, it is understood that first and second polarizers can be provided, the first polarizer can be adjacent the TFT glass and the second polarizer can be adjacent the color filter glass such that the TFT glass and the color filter glass are disposed between the first and second polarizers.

FIG. 3 also shows a pixel material 315 disposed between TFT glass 309 and color filtered glass 303. Pixel material 315 is shown in FIG. 3 as separate volumn regions or cells above the circuit elements 311. For example, when the pixel material is a liquid crystal, these volumn regions or cells are meant to illustrate regions of the liquid crystal controlled by the electric field produced by the pixel electrode and common electrode of the volume region or cell under consideration. Pixel material 315 can be a material that, when operated on by the display circuitry of touch screen 220, can generate or control an amount, color, etc., of light produced by each display pixel. For example, in an LCD touch screen, pixel material 315 can be formed of liquid crystal, with each display pixel controlling a volumn region or cell of the liquid crystal. In this case, for example, various methods exist for operating liquid crystal in a display operation to control the amount of light emanating from each display pixel, e.g., applying an electric field in a particular direction depending on the type of LCD technology employed by the touch screen. In an in-plane switching (IPS), fringe field switching (FFS), and advanced fringe field switching (AFFS) LCD displays, for example, electrical fields between pixel electrodes and common electrodes (Vcom) disposed on the same side of the liquid crystal can operate on the liquid crystal material to control the amount of light from a backlight that passes through the display pixel. In an OLED (organic light emitting diode) display, for example, pixel material 315 can be, for example, an organic material in each pixel that generates light when a voltage is applied across the material. One skilled in the art would understand that various pixel materials can be used, depending on the type of display technology of the touch screen.

Figure 3A:
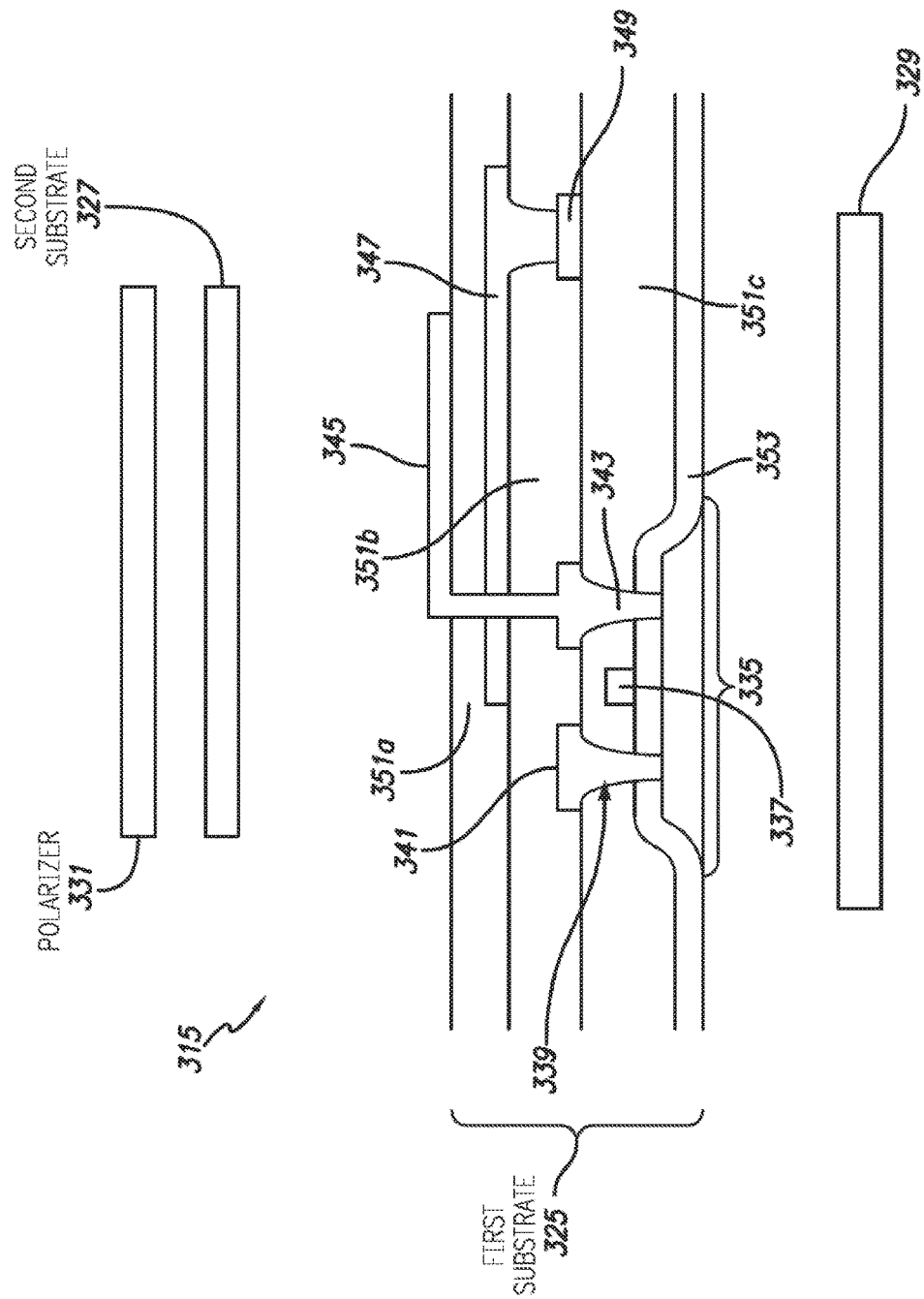
FIG. 3A illustrates an example display pixel stackup according to embodiments of the disclosure.

FIG. 3A illustrates an enlarged view of a display pixel (as for example, a particular R, B, or G sub-pixel). As may be seen in FIG. 3A, there can be provided a first substrate 325 (such as the TFT glass 309 of FIG. 3), a second substrate 327 (such as the color filter glass 303 of FIG. 3), a first polarizer 329 and a second polarizer 331. The first polarizer 329 can be disposed adjacent the first substrate 325, and the second polarizer 331 can be disposed adjacent the second substrate 327. One display pixel of the first substrate 325 is shown greatly enlarged for purposes of illustration. A TFT 335 can have a gate 337, a source 339 connected to a data line 341, and a drain 343 connected to pixel electrode 345. Common electrode 347 can be disposed adjacent the pixel electrode 345 and can be connected to a common electrode conductive line 349. Layers of dielectric material 351a, 351b and 351c can be disposed as shown in FIG. 3A to separate electrodes from one another. FIG. 3A also illustrates gate insulation layer 353. An electrical fringe field between the pixel electrode 345 and the common electrode 347 can control the pixel material disposed between the first and second substrates during the display operation in order to provide a display image.

Figure 4:
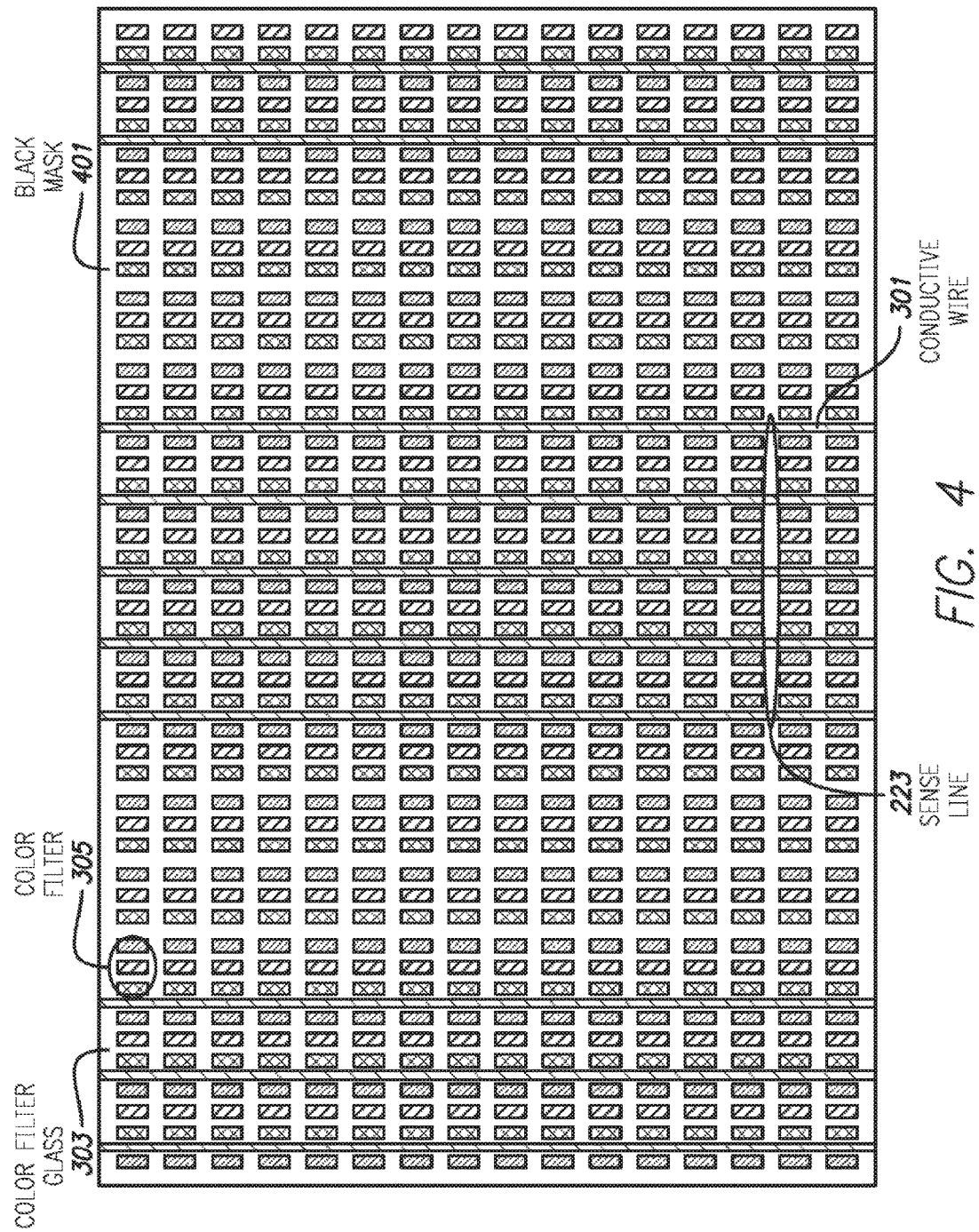
FIG. 4 illustrates a more detailed view of an example color filter glass including sense lines disposed on an underside of the color filter glass according to embodiments of the disclosure.

FIG. 4 illustrates a more detailed view of color filter glass 303. FIG. 4 includes color filters 305, conductive wires 301, which form sense lines 203. Conductive wires 301 can be, for example, metal lines such as aluminum, etc. In this regard conductive wires 301 can be positioned behind a black mask 401 so that the conductive wires are not visible to a user. Therefore conductive wires 301 need not be transparent conductors. However, in some example embodiments, conductive wires 301 can be transparent metal. Although in the example embodiment shown in FIG. 4 the spacing between the columns of color filters 305 can be widened to accommodate conductive wires 301, in some embodiments the spacing can be different, including equal spacing between the color filters.

Figure 5:
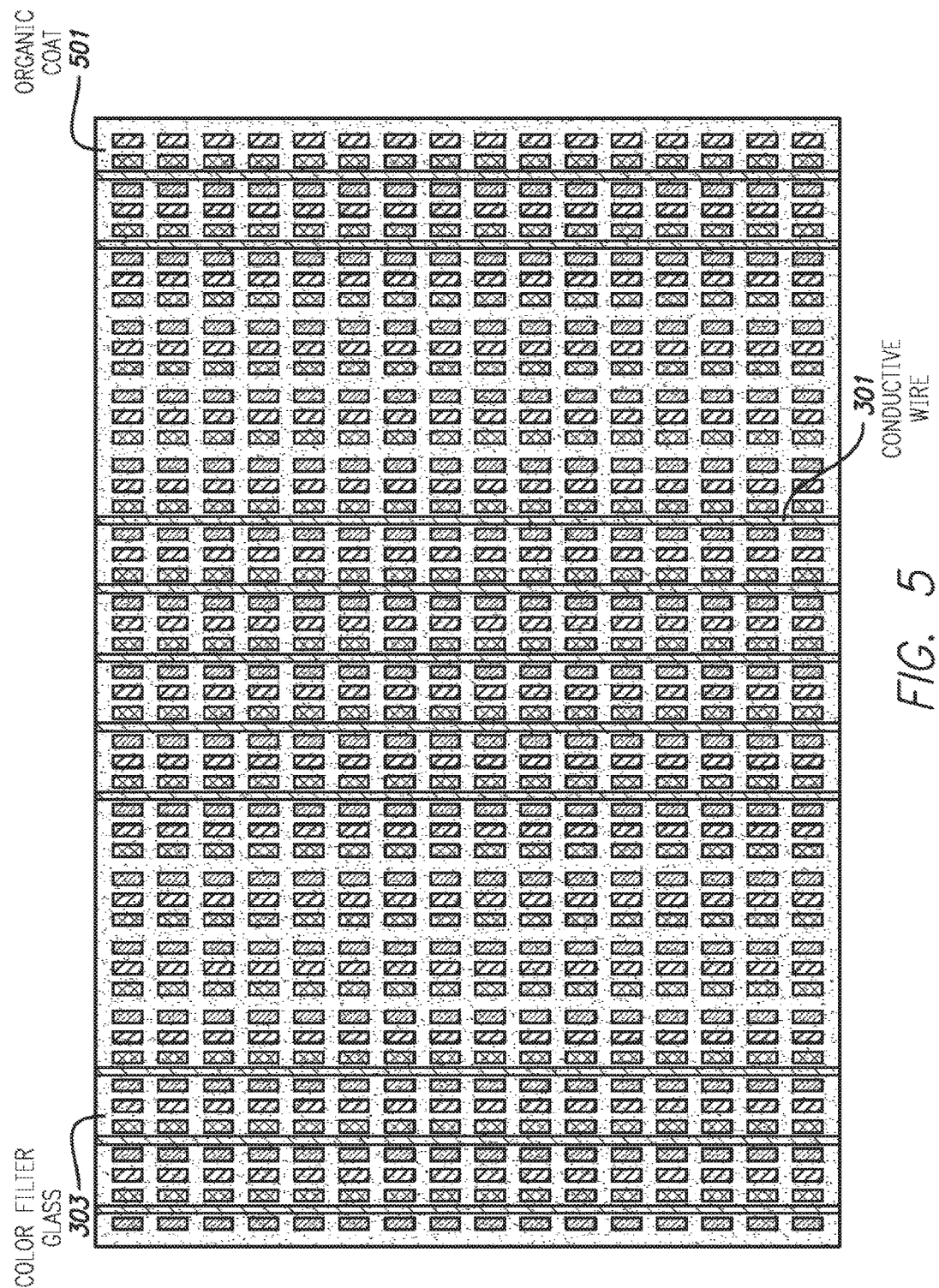
FIG. 5 illustrates an example color filter glass that includes an organic coat formed over conductive wires according to embodiments of the disclosure.

FIG. 5 illustrates an example embodiment that includes an organic coat 501 that has been formed over conductive wires 301. In other words, conductive wires 301 can be formed on the underside of color filter glass 303, and then organic coat 501 can be formed on conductive wires 301, such that the conductive wires are disposed between color filter glass 303 and organic coat 501. Organic coat 501 can be formed of a material that can protect the conductive wires from exposure to chemicals, from physical abrasion, etc.

Figure 6:
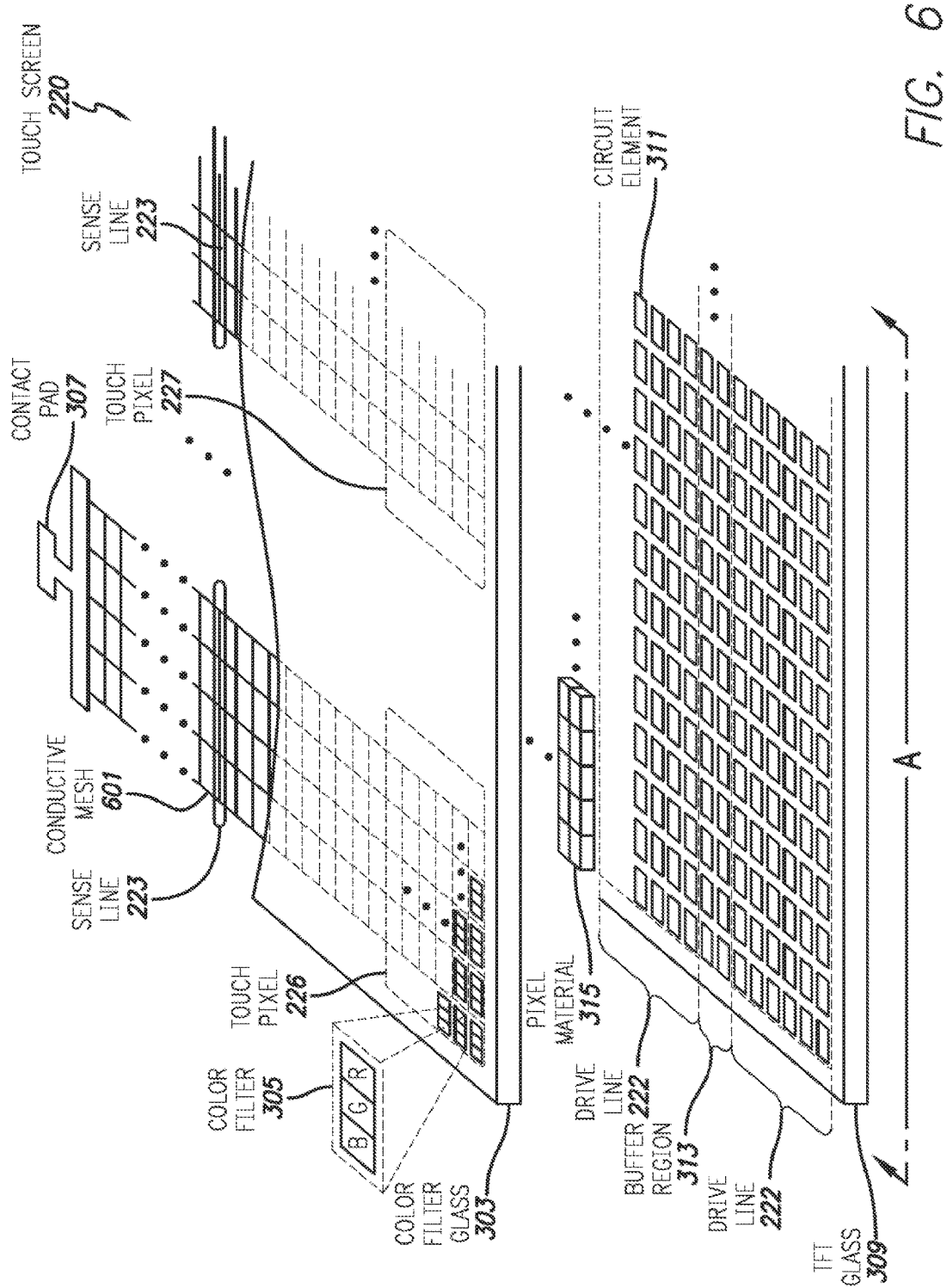
FIG. 6 illustrates other example configurations of sense lines, drive lines, and other example structures of a touch screen according to embodiments of the disclosure.

FIG. 6 illustrates another example embodiment showing another example configuration of sense lines 223. As in the example shown in FIG. 3, the example shown in FIG. 6 is a perspective view along line "A" shown in FIG. 2. In the example embodiment shown in FIG. 6, each of the sense lines 223 can include a conductive mesh 601. Conductive mesh 601 can be formed of, for example, metal wires, metal strips, etc., that are formed on the underside of color filter glass 303. Conductive mesh 601 can be, for example, a conductive orthogonal grid, the conductive lines of which are disposed between individual color filters 305.

Sense line 223, formed of conductive mesh 601, can be conductively connected to contact pad 307 such that a sense signal received by the sense line can be transmitted to touch controller 206 for processing. Similar to the previous embodiment, the portion of touch screen 220 shown in example embodiment in FIG. 6 includes drive lines 222 and buffer regions 313, each of which can be formed of circuit elements 311 that have been grouped together either operationally or physically to perform their respective functions.

In a touch sensing operation, stimulation signals applied to drive lines 222 can allow touches to be sensed by sense lines 223 in the areas of various touch pixels, such as touch pixels 226 and 227. The example embodiment shown in FIG. 6 also includes pixel material 315, similar to the example embodiment shown in FIG. 3.

Figure 7:
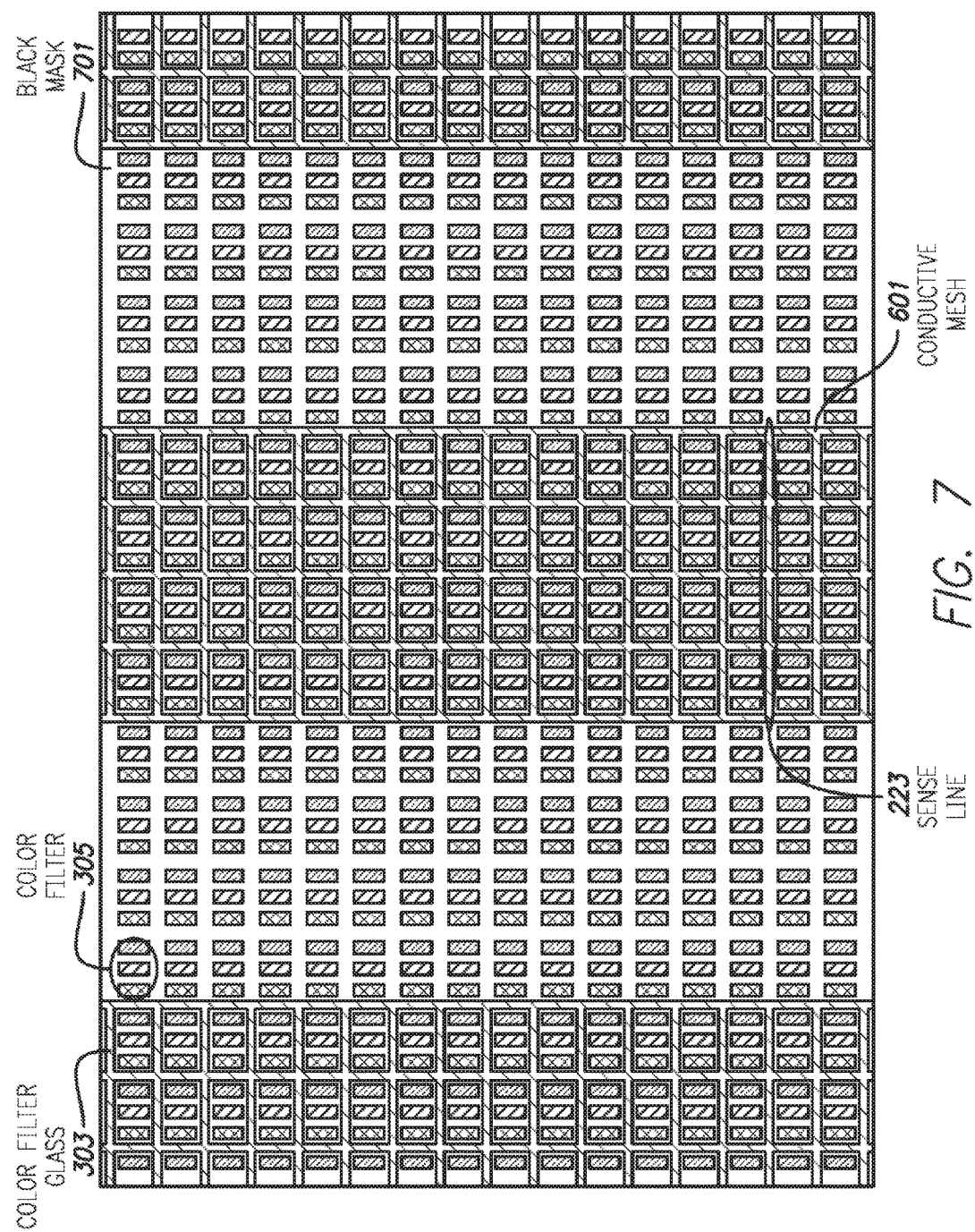
FIG. 7 illustrates a more detailed view of another example color filter glass including sense lines disposed on an underside of the color filter glass according to embodiments of the disclosure.

FIG. 7 illustrates a more detailed view of color filter glass 303 shown in the example embodiment FIG. 6. FIG. 7 includes color filters 305 and conductive mesh 601, which form sense lines 203. Conductive mesh 601 can be, for example, formed of non-transparent metal lines such as aluminum, etc. In this regard conductive mesh 601 can be positioned behind a black mask 701 so that the conductive mesh is not visible to a user. Therefore, in this embodiment, the conductive mesh 601 need not be made of transparent conductors. However, in some example embodiments, conductive mesh 601 can be transparent metal.

Figure 8:
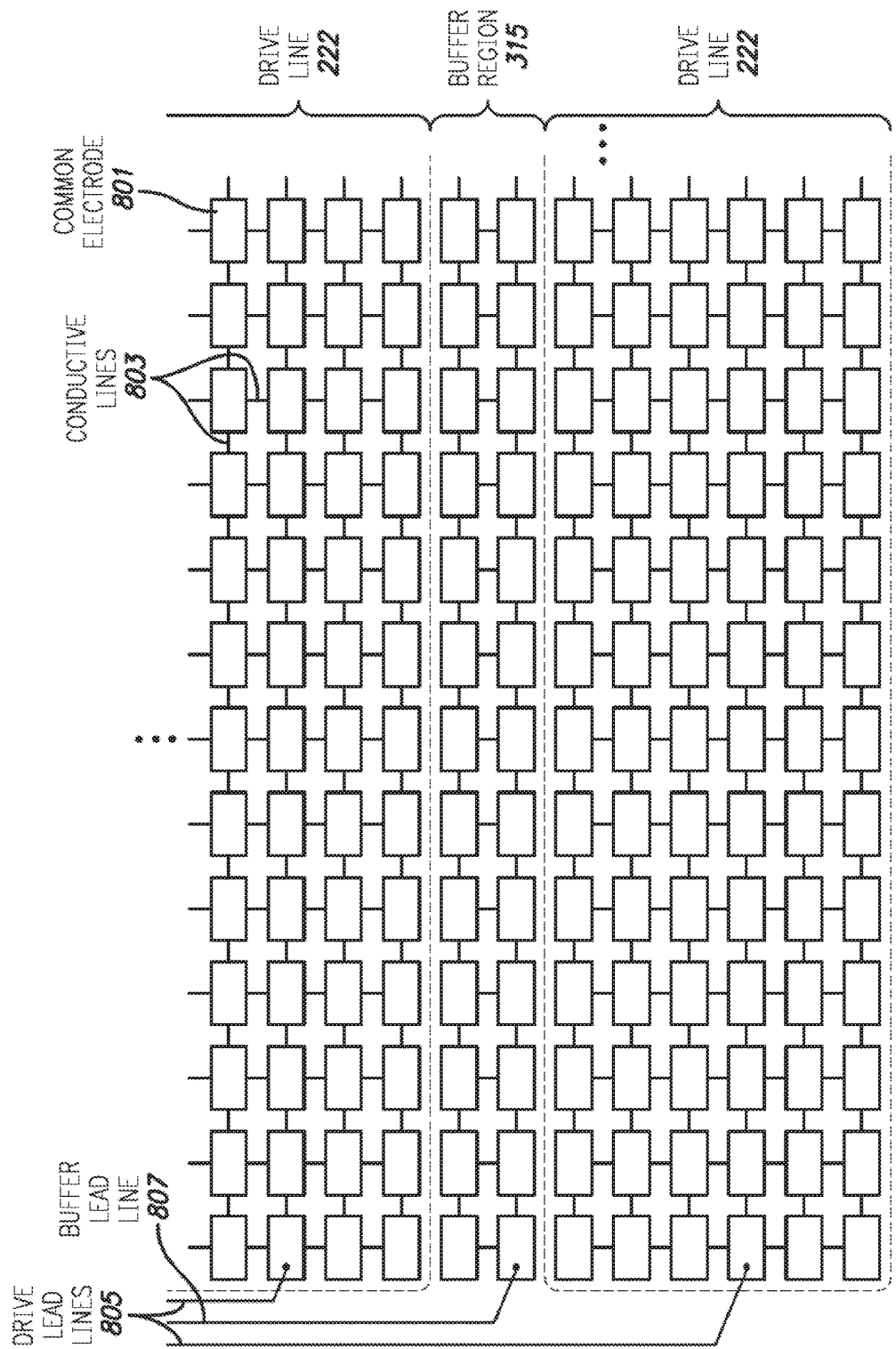
FIG. 8 illustrates an example configuration of drive lines including circuit elements of a TFT layer of a touch screen according to embodiments of the disclosure.

FIG. 8 illustrates a more detailed view of an example configuration of drive lines 222 and buffer regions 313 according to various embodiments. In this example embodiment, circuit elements 311 can include common electrodes 801. Common electrodes 801 can be operated as multi-function circuit elements that can operate as part of the display circuitry in a display operation and can operate as part of the touch sensing circuitry in a touch sensing operation of the touch screen. Common electrodes 801 can be electrically connected together with conductive lines 803, to form the required regions such as regions that operate as drive lines 222 and regions that operate as buffer regions 313. In this example embodiment, common electrodes functional region can be physically connected with fixed conductive lines. In other words, the common electrodes in each region can be permanently connected through the physical design of the touch screen. In other words, common electrodes 801 can be grouped together to form drive lines. Grouping multi-function circuit elements of display pixels can include operating the multi-function circuit elements of the display pixels together to perform a common function of the group. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Stimulation signals can be applied to drive lines 222 through drive lead lines 805. For example, drive lead lines can be electrically connected to driver logic 214, which can provide the stimulation signals during the touch sensing operation. Buffer region 313 can be connected to a buffer lead line 807, which can be connected to a buffer operator (not shown).

In the example shown in FIG. 8, each common electrode (Vcom) 801 can serve as a multi-function circuit element that can operate as display circuitry of the display system of touch screen 220 and can also operate as touch sensing circuitry of the touch sensing system. In this example, each common electrode 801 can operate as a common electrode of the display circuitry of the touch screen, and can also operate together when grouped with other common electrodes as touch sensing circuitry of the touch screen. For example, a group of common electrodes 801 can operate together as a part of a drive line of the touch sensing circuitry during the touch sensing operation. Other circuit elements of touch screen 220 can form part of the touch sensing circuitry by, for example, electrically connecting together common electrodes 801 of a region, switching electrical connections, etc. Each display pixel can include a common electrode 801, which can be a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

Figure 9:
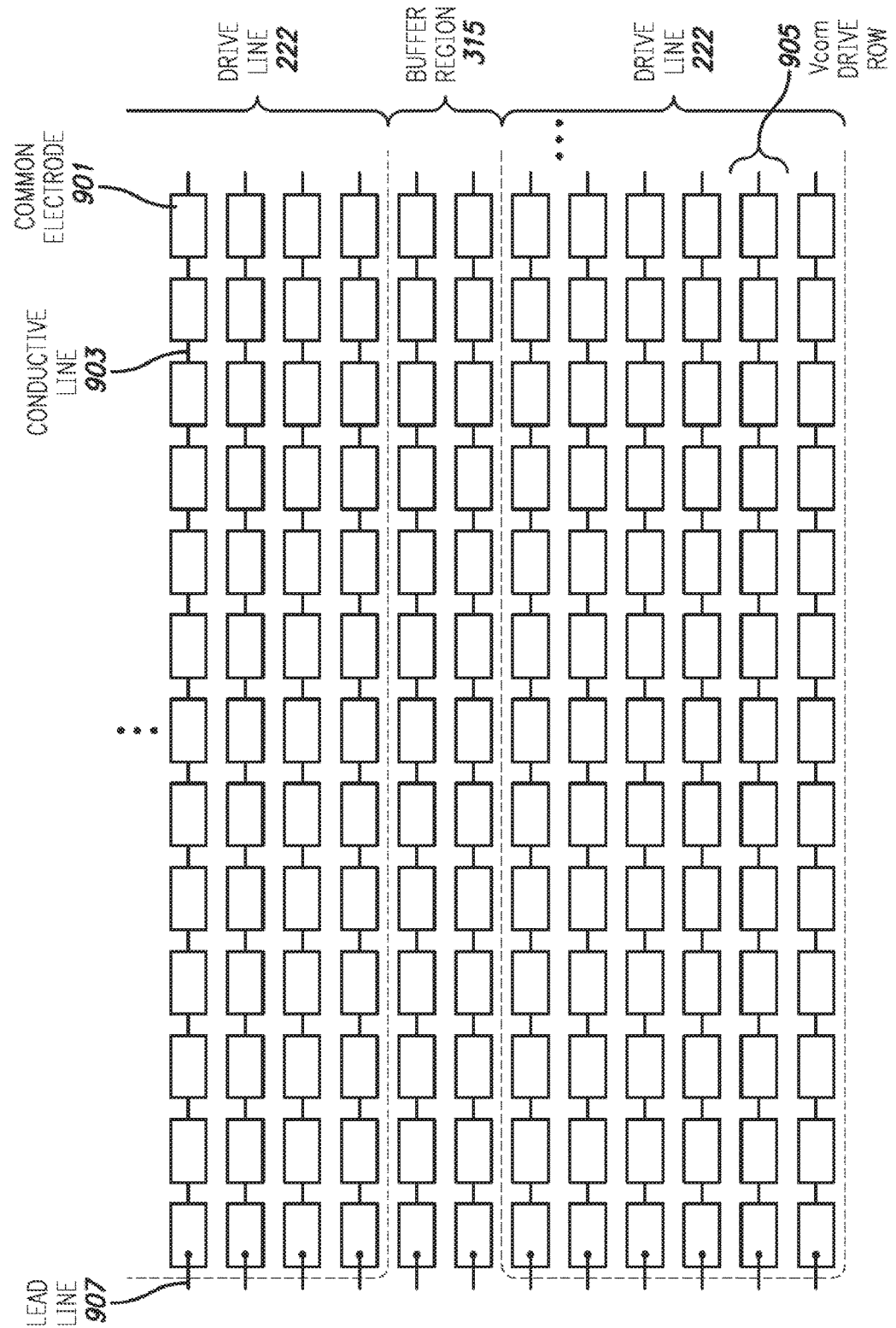
FIG. 9 illustrates another example configuration of drive lines including circuit elements of a TFT layer of a touch screen according to embodiments of the disclosure.

In the embodiment shown in FIG. 9, the circuit elements used to form drive lines, Vcom 901 in this example, can be physically connected together on the TFT glass through conductive lines 903 to form individual rows of connected together Vcom 901. The individual rows of Vcom, i.e., Vcom drive rows 905, can be connected together with other Vcom drive rows in the periphery using contact pads 907. In this example, each drive line 222 can be formed through fixed electrical connections.

Figure 9A:
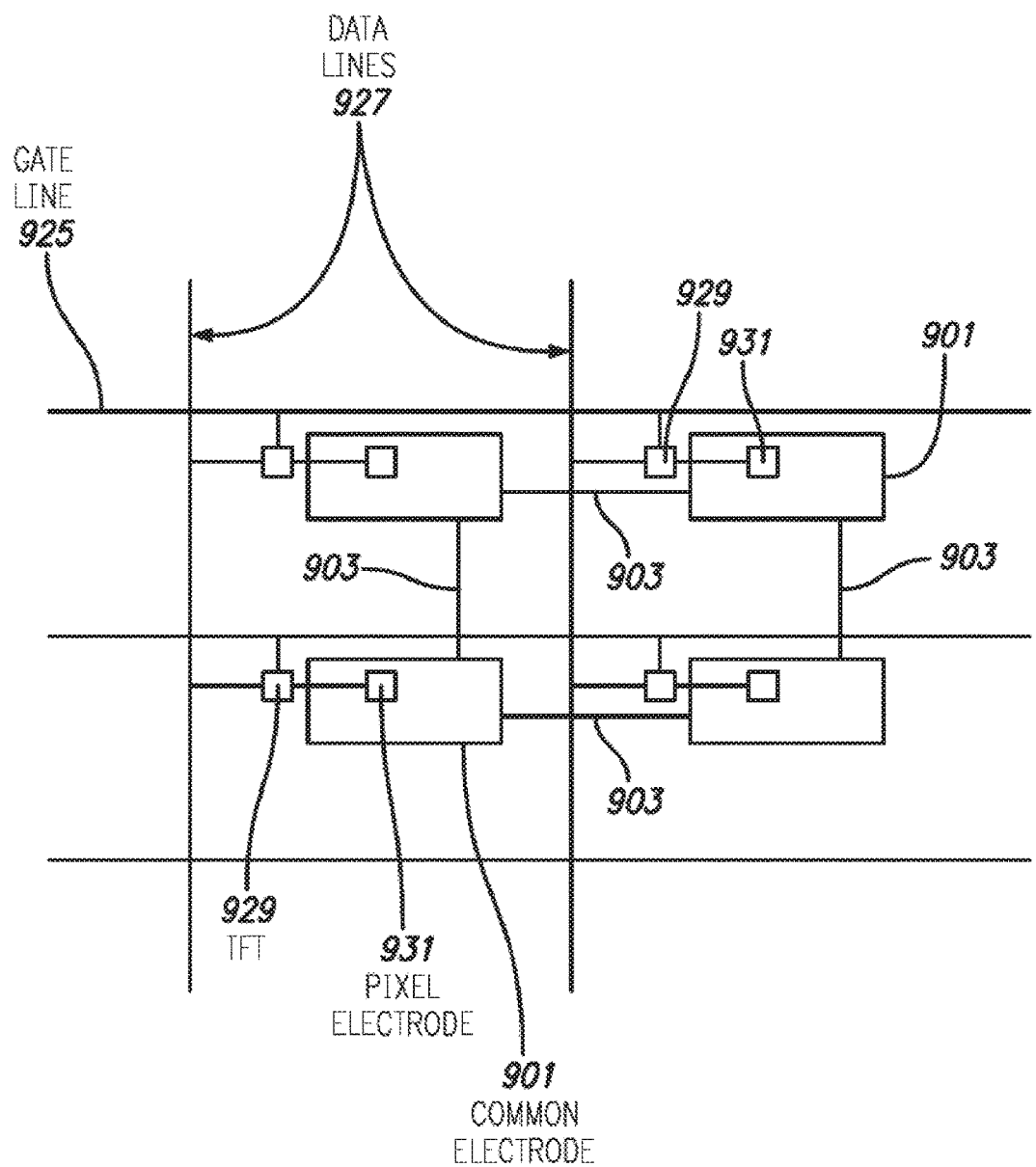
FIG. 9A illustrates an example circuit of a TFT substrate according to embodiments of the disclosure.

FIG. 9A illustrates a more detailed view of the TFT glass substrate previously illustrated in FIGS. 3, 6, 8 and 9. It is understood that the pixel electrodes, gate lines, data lines, TFT elements, and common electrode conductive lines connecting together the common electrodes are also present in FIGS. 3, 6, 8 and 9, but have been omitted for simplicity of illustration. Thus, as seen in FIG. 9A, gate lines 925 extend in a row (horizontal) direction and data lines 927 extend in a column (vertical) direction. The gate lines can be connected to gates of transistors 929 (for example, thin film transistors, TFTs) and control (e.g., turn on) these transistors to permit data from the data lines 927 to be applied to pixel electrodes 931 during a display operation. During the display operation, common electrodes 901 can be held at a preset voltage. FIG. 9A also shows conductive lines 903 interconnecting common electrodes 901 along the row and column directions. An electrical field can be formed by the difference in voltage between pixel electrode 931 and its corresponding common electrode 901 and this electric field can control the pixel material disposed above the first substrate (disposed between the first and second substrates). A pixel can be formed at each crossing of gate line 925 and data line 927 and comprises the pixel electrode 931 and its corresponding common electrode 901.

FIGS. 10 and 11 illustrate an example color filter glass design and an example TFT design, respectively, according to various embodiments. FIG. 10 includes an example configuration of multiple sense lines 223, each including multiple conductive wires such as conductive wires 301, connected to multiple contact pads, such as contact pad 307. For the sake of clarity, individual color filters are not shown in FIG. 10. In this example embodiment, conductive wires 301 and contact pads 307 can be formed on color filter glass 303 by, for example, physical vapor deposition (PVD).

FIG. 11 illustrates an example TFT glass according to various example embodiments. TFT glass 1101 can include various touch sensing circuitry and display circuitry. Touch sensing circuitry can include, for example, drive lines 222. In this example embodiment, each drive line 222 can include multiple Vcom drive rows 1103. In this example embodiment, each Vcom drive row 1103 in a drive line 222 can be connected to a single conductive contact pad 1105 on the left side of the TFT glass, and connected to a single contact pad 1105 on the right side of TFT glass. Contact pads 1105 can be connected through drive signal lines 1107 to touch controller 206 (FIG. 2) through a touch flex circuit 1109. In this way, for example, multiple Vcom drive rows 1103 can be driven together as a single drive line 222 during a touch sensing operation. TFT glass 1101 can also include integrated drivers 1111 that can drive the display circuitry, for example, using various display circuit elements such as gate lines, data lines, etc. Touch flex circuit 1109 can also be connected to sense signal lines 1113, which can be connected to contact pads 307 on the color filter glass through conductive paste 1115.

Figure 12:
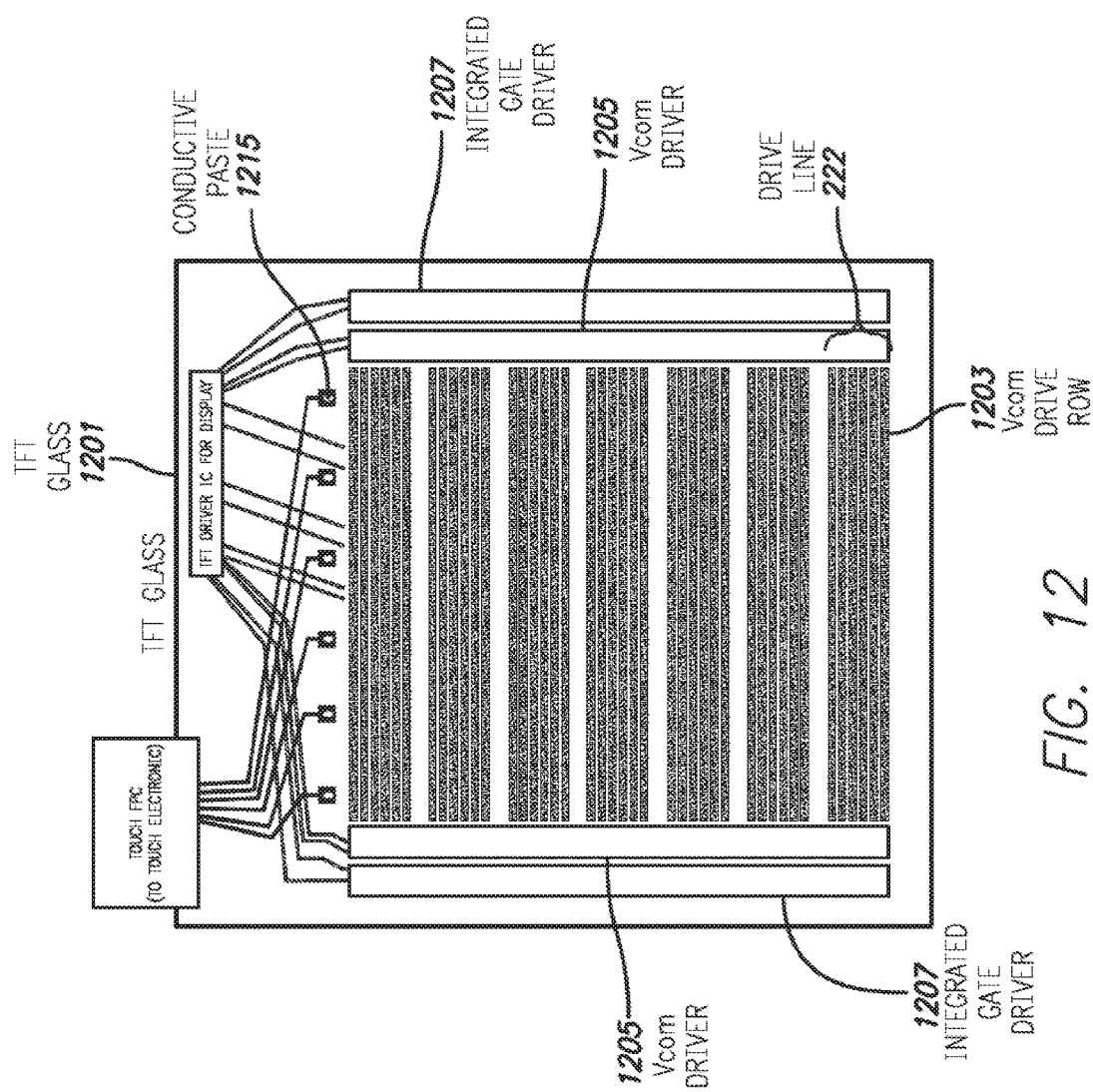
FIG. 12 illustrates another example configuration of a TFT glass according to embodiments of the disclosure.

FIG. 12 illustrates another example TFT glass design. FIG. 12 shows a TFT glass 1201 in which individual rows of Vcom are electrically connected together to form Vcom drive rows 1203. In other words, similar to the previous embodiment, each Vcom circuit element in Vcom drive row 1203 is permanently connected to the other Vcom in the drive row. However, in the example embodiment shown in FIG. 12, each individual Vcom drive row 1203 can be connected to a Vcom driver 1205 in the periphery of TFT glass 1201. Vcom driver 1205 can operate the Vcom drive rows 1203 in each drive line 222 to generate the same stimulation signals on each individual Vcom drive row 1203 of each drive line 222 during a touch sensing operation. In other words, a first stimulation signal can be applied to a first group of individual rows of Vcom, and a second stimulation signal can be applied to a second group of individual rows of Vcom. In this way, for example, a group of multiple Vcom drive rows 1203 can be operated together as a single drive line 222 even though the individual Vcom drive rows themselves are not connected to each other through fixed electrical connections.

Likewise, during a display operation of the touch screen, integrated gate drivers 1207 can operate the individual Vcom drive rows 1203 as part of the display circuitry to display an image on the touch screen. Therefore, in this example embodiment, the individual Vcom drive rows 1203 can be grouped together or operated individually as needed depending on the operation of the touch screen.

Figure 13:
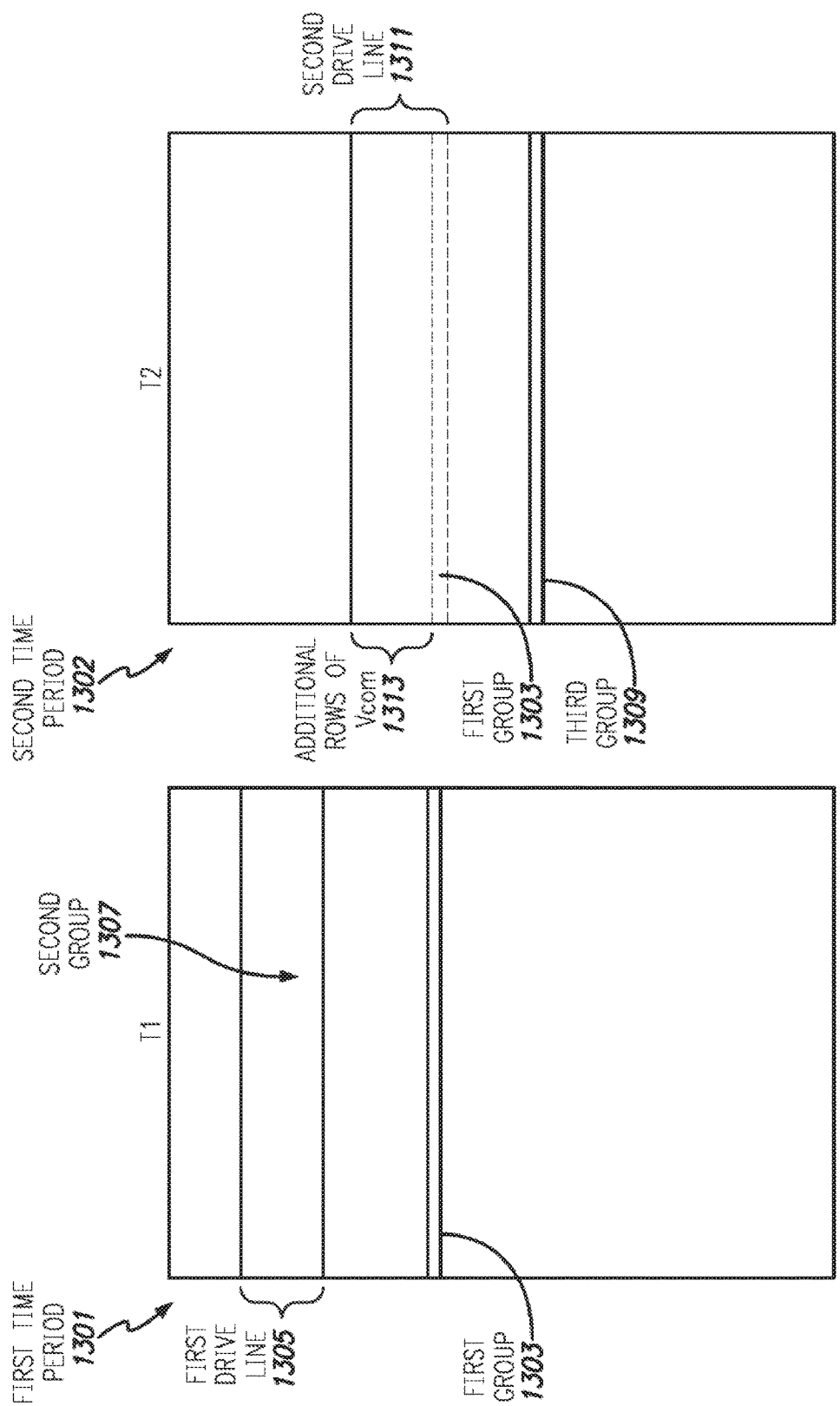
FIG. 13 illustrates an example method of driving circuit elements of a touch screen in a display operation and in a touch sensing operation according to embodiments of the disclosure.

FIG. 13 illustrates an example method of driving the circuit elements of the touch screen in the display operation and in the touch sensing operation. This example method can apply to an operation of a touch screen including the design of TFT glass 1201 of FIG. 12, for example. In this example embodiment, the display operation in which an image is displayed and the touch sensing operation in which touch is sensed can occur concurrently by operating different portions of the touch screen differently, that is, one group of circuit elements can be operated as display circuitry to display an image while, at the same time, another group of the circuit elements can be operated as touch sensing circuitry to sense a touch.

In a first time period 1301, integrated gate driver 1207, along with other display circuitry, can update a first group 1303 of circuit elements, e.g., an individual row of display pixels, to display a line of an image on the touch screen. For example, integrated gate driver 1207 can apply a common voltage to the Vcom in the first row of display pixels. Concurrently, in first time period 1301, Vcom driver 1205 can apply a stimulation signal to a first drive line 1305 that includes a second group 1307 of the circuit elements. Applying the stimulation signal can include, for example, applying the same stimulation signal to each of the individual Vcom drive rows 1203 in the first drive line 222. Because the image scanning row currently being scanned by integrated gate driver 1207 is not located in first drive line 1305, the Vcom drive rows 1203 being used for updating the displayed image do not overlap with the Vcom drive rows 1203 used for touch sensing as a drive line.

A second time period 1302 shows a third group 1309 of circuit elements can be operated as display circuitry, e.g., integrated gate driver 1207 can apply a common voltage to the Vcom in a third row of display pixels. The common voltage applied to the Vcom in the third row can be, for example, of an opposite polarity to the common voltage applied to the Vcom in the first row of display pixels. Concurrently, in second time period 1302, Vcom driver 1205 can apply a stimulation signal to a second drive line 1311 that includes first group 1303 and additional rows of Vcom 1313. In this way, for example, display operation and touch sensing operation can occur concurrently in an integrated touch screen.

In the example driving method shown in FIG. 13, display updating can be done on a row by row basis for individual Vcom drive rows 1203. In some embodiments, integrated gate driver 1207 can change the Vcom polarity on a row by row basis as well. For example, for each row of display pixel integrated gate driver 1207 can operate to change the polarity of Vcom, switch the gates of the row of display pixels to an "on" state, write data into each display pixel, and switch the gates to an "off" state. When different rows of Vcom are operated to perform touch sensing concurrently with display updating, as in this example embodiment, it is noted that in the touch sensing groups of circuit elements no data is being written into the display pixels in the rows of pixels in the drive line because the gate lines of these rows of display pixels are in the "off" state.

Figure 14:
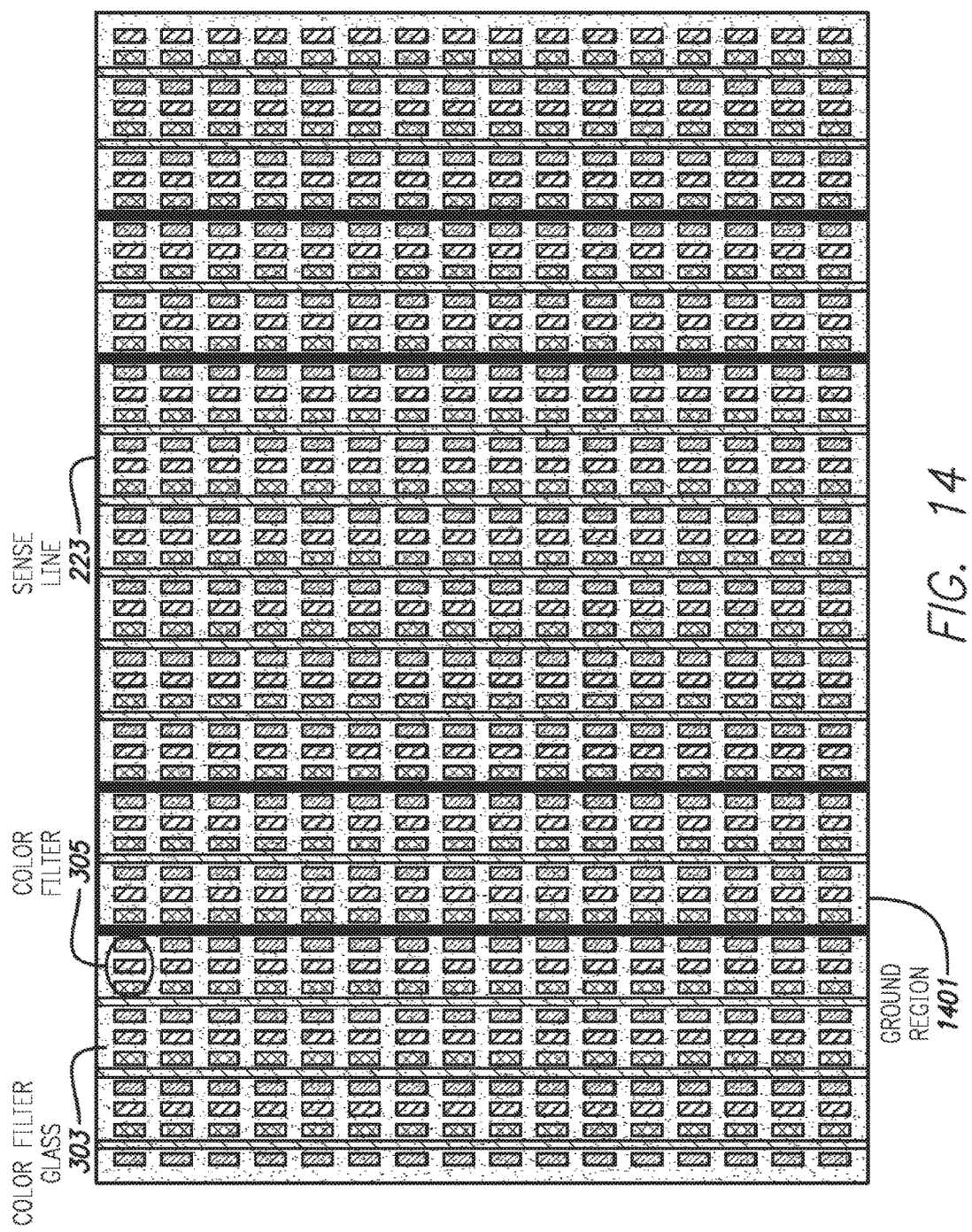
FIG. 14 illustrates another example configuration of a color filger glass according to embodiments of the disclosure.

FIG. 14 illustrates another example embodiment of sense lines 223. FIG. 14 illustrates a color filter glass 303 that includes sense lines 223 formed of a transparent conductor, such as indium tin oxide (ITO), on the underside of color filter glass 303. The ITO can be deposited on the underside of color filter glass 303 to cover a contiguous area including covering color filters 305. FIG. 14 also illustrates ground regions 1401 between sense lines 223. Ground regions 1401 can be formed of transparent conductor, such as ITO formed on the underside of color filter glass 303 and electrically separated from the sense lines on either side of each sense line. Ground regions 1401 can be connected to, for example, a ground or virtual ground in the periphery of the panel. Positioning ground regions between sense regions can help reduce interference in some embodiments.

Figure 15:
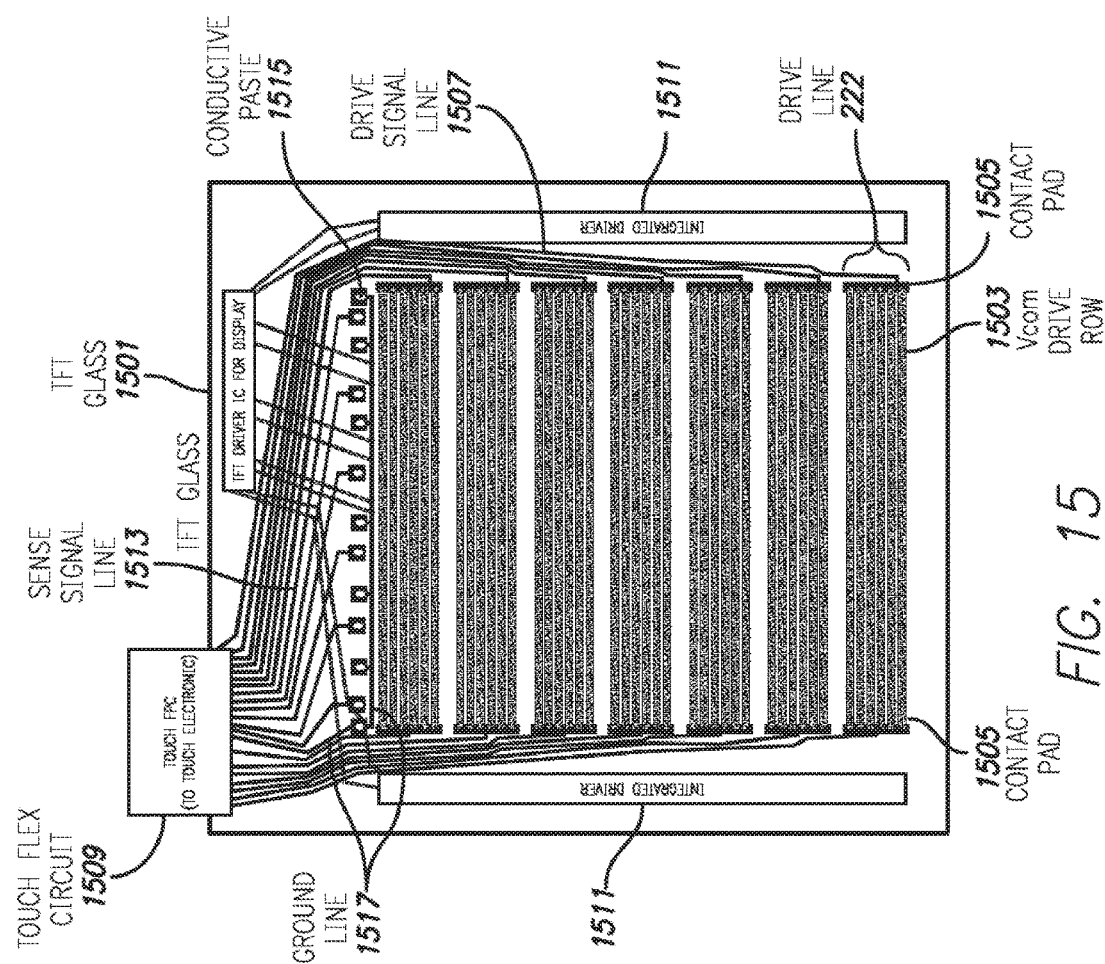
FIG. 15 illustrates another example configuration of a TFT glass according to embodiments of the disclosure.

FIG. 15 illustrates an example TFT glass design, TFT glass 1501. In this example, TFT glass 1501 can include various touch sensing circuitry and display circuitry. Touch sensing circuitry can include, for example, drive lines 222. In this example embodiment, each drive line 222 can include multiple Vcom drive rows 1503. In this example embodiment, each Vcom drive row 1503 in a drive line 222 can be connected to a single conductive contact pad 1505 on the left side of the TFT glass, and connected to a single contact pad 1105 on the right side of TFT glass. Contact pads 1505 can be connected through drive signal lines 1507 to touch controller 206 through a touch flex circuit 1509. In this way, for example, multiple Vcom drive rows 1503 can be driven together as a single drive line 222 during a touch sensing operation. TFT glass 1501 can also include integrated drivers 1511 that can drive the display circuitry, for example, using various display circuit elements such as gate lines, data lines, etc. Touch flex circuit 1509 can also be connected to sense signal lines 1513, which can be connected to contact pads 307 on the color filter glass through conductive paste 1515.

In FIGS. 3, 6, 8 and 9, each row of display pixels is illustrated as having a separate common electrode for each display pixel. These common electrodes (for example, circuit elements 311 of FIGS. 3 and 6, common electrode 801 of FIG. 8, and common electrode 901 of FIG. 9) may however, not be physically distinct and separate structures corresponding to each pixel electrode. In some embodiments the common electrodes that are electrically connected together across a particular row, as for example, Vcom drive row 905 of FIG. 9, may be formed by a single, continuous layer of conductive material, e.g., ITO. Further, a single continuous layer of conductive material (ITO) may be used for an entire drive line 222 such as in FIG. 8 where the illustrated common electrodes within each drive line 222 are electrically connected together along both rows (first direction) and columns (second direction, perpendicular to the first direction).

In addition, although example embodiments herein may describe the display circuitry as operating during a display operation, and describe the touch sensing circuitry as operating during a touch sensing operation, it should be understood that a display operation and a touch sensing operation may be operated at the same time, e.g., partially or completely overlap, or the display operation and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. In other words, in some embodiments, each sub-pixel can be a red (R), green (G), or blue (B) sub-pixel, with the combination of all three R, G and B sub-pixels forming one color display pixel. One skilled in the art would understand that other types of touch screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. A capacitive touch screen including a plurality of display pixels, the capacitive touch screen comprising:
    a color filter layer;
    a thin film transistor (TFT) substrate including a plurality of drive lines configured to transmit a stimulation signal for stimulating the capacitive touch screen to detect touch input events in a touch sensing operation, each drive line including a plurality of Vcom drive rows, each Vcom drive row being unconnected by fixed electrical connections to other Vcom drive rows within a drive line so as to form individual Vcom drive rows, each Vcom drive row including groups of the plurality display pixels, each display pixel having a TFT including a gate and a common electrode, the gate of the TFT controlling the TFT to operate in a display operation and in the touch sensing operation;
    a liquid crystal layer disposed between the TFT substrate and the color filter layer;
    an integrated gate driver coupled to the gates of the TFTs in each individual Vcom drive row for individually operating each of the individual Vcom drive rows to display an image on the capacitive touch screen;
    a Vcom driver connected to each of the plurality of individual Vcom drive rows within each drive line for providing the same stimulation signal on each individual Vcom drive row within each drive line; and
    a plurality of sense lines disposed between liquid crystal layer and the color filter layer, the sense lines configured to receive sense signals based on the stimulation signals transmitted by the drive lines;
    wherein the drive lines and the sense lines form a plurality of capacitive sensing nodes.

2. The touch screen of claim 1, wherein a ground region is electrically separated from and disposed on either side of each of the plurality of sense lines.

3. The touch screen of claim 2, wherein during the touch sensing operation a first stimulation signal is applied to a first drive line and a second stimulation signal is applied to a second drive line.

4. The touch screen of claim 2, wherein the common electrodes of the groups of the plurality of display pixels are connected to display circuitry during the display operation of the touch screen.

5. The touch screen of claim 1 further comprising an organic coating formed over the plurality of sense lines, wherein the plurality of sense lines are disposed on an underside of the color filter layer and are protected by the organic coating.

6. The touch screen of claim 5, wherein the color filter layer comprises individual color filters and the plurality of sense lines are disposed between individual color filters.

7. The touch screen of claim 1, wherein each of the plurality of sense lines includes a plurality of non-transparent conductive lines disposed behind a black mask on the color filter layer such that the sense lines are not visible to a user of the touch screen.

8. The touch screen of claim 7, wherein the plurality of sense lines form a conductive mesh comprising a conductive orthogonal grid of conductive material.

9. The touch screen of claim 1, wherein the color filter layer comprises individual color filters and wherein the sense lines are disposed between the individual color filters.

10. A capacitive touch screen including a plurality of display pixels, the capacitive touch screen comprising:

a color filter substrate;
a plurality of drive lines that carry, during a touch sensing operation, stimulation signals for stimulating the capacitive touch screen to detect touch and proximity events, each of the plurality of drive lines including a plurality of Vcom drive rows, each Vcom drive row being unconnected by fixed electrical connections to other Vcom drive rows within a drive line so as to form individual Vcom drive rows, each Vcom drive row including groups of the plurality display pixels, each display pixel having a TFT including a gate and a common electrode, the gate of the TFT controlling the TFT to operate in a display operation and in the touch sensing operation;
a pixel material disposed between the plurality of drive lines and the color filter substrate;
display circuitry that controls, during a display operation, the pixel material of each display pixel such that a controlled amount of light from each display pixel passes through color filters on the color filter substrate to form an image;
an integrated gate driver coupled to the gates of the TFTs in each individual Vcom drive row for individually operating each of the individual Vcom drive rows to display an image on the capacitive touch screen;
a Vcom driver connected to each of the plural individual Vcom drive rows within each drive line, wherein individual drive rows may be grouped together, for application of the same stimulation signal in the touch sensing operation or operated individually for displaying the image; and
a plurality of sense lines that receive sense signals based on the stimulation signals, the sense lines being disposed between the pixel material and the color filter substrate; and
touch sensing circuitry connected to receive the sense signals from the plurality of sense lines;
wherein the color filter substrate includes a plurality of individual color filters, and the sense lines include conductive material disposed between individual color filters.

11. The touch screen of claim 10, wherein a ground region is electrically separated from and disposed on either side of each of the plurality of sense lines.

12. The touch screen of claim 10 wherein the sense lines include non-transparent conductive material.

13. The touch screen of claim 11, wherein the sense lines include transparent conductive material.

14. The touch screen of claim 11, further comprising an organic coat disposed on the sense lines.

15. The touch screen of claim 10, wherein the pixel material includes a light modifying material.

16. The touch screen of claim 10, wherein the pixel material includes a light generating material.

17. A touch screen including a plurality of display pixels, the touch screen comprising:
a first substrate including a plurality display pixels disposed thereon, each display pixel including a pixel electrode and a switching element for connecting a data line to the pixel electrode to display an image on the touch screen during a display mode of operation, and for disconnecting the data line from the pixel electrode during a touch sensing mode of operation;
a plurality of drive lines, each of the plurality of drive lines including plural Vcom drive rows, each Vcom drive row including a plurality of groups of the display pixels, each display pixel within each group including a TFT having a gate and a transparent common electrode, each Vcom drive row being unconnected by fixed electrical connections to other Vcom drive rows within a drive line so as to form individual Vcom drive rows, the common electrodes receiving a common voltage during the display mode of operation and a stimulation voltage during the touch sensing mode of operation;
a second substrate including a color filter layer having individual color filters;
a pixel material disposed between the first and second substrates; and
the gate of the TFT controlling the TFT to operate in the display mode of operation and in the touch sensing mode of operation;
an integrated gate driver coupled to the gates of the TFTs in each individual Vcom drive row for operating the individually operating each of the individual Vcom drive rows to display an image on the capacitive touch screen;
a Vcom driver connected to each of the plural individual Vcom drive rows within each drive line wherein individual drive rows may be grouped together, for application of the same stimulation signal in the touch sensing operation or operated individually for displaying the image; and
a plurality of sense lines disposed on the second substrate and positioned between the individual color filters.

18. The touch screen of claim 17, wherein the stimulation voltage includes an alternating current waveform.

19. The touch screen of claim 18, wherein the display pixels are arranged along a first direction and along a second direction, perpendicular to the first direction, and wherein a plurality of drive lines are formed by the plurality of groups of display pixels; and
the plurality of sense lines are disposed along the second direction, crossing the drive lines;
wherein each intersection of one of the drive lines with one of the sense lines forms a capacitive sensing node.

20. The touch screen of claim 17, wherein the pixel material includes a light modifying material.

* * * * *